(12) United States Patent
Steinkraus et al.

(10) Patent No.: US 10,277,319 B2
(45) Date of Patent: *Apr. 30, 2019

(54) PHASE SENSITIVE BEAM TRACKING SYSTEM

(71) Applicant: X DEVELOPMENT LLC, Mountain View, CA (US)

(72) Inventors: Robert Steinkraus, San Francisco, CA (US); Klaus Ulander, Livermore, CA (US)

(73) Assignee: X Development LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/889,193

(22) Filed: Feb. 5, 2018

(65) Prior Publication Data
US 2018/0175934 A1 Jun. 21, 2018

Related U.S. Application Data

(63) Continuation of application No. 15/163,745, filed on May 25, 2016, now Pat. No. 9,917,645.

(51) Int. Cl.
*H04B 10/118* (2013.01)
*H04B 10/11* (2013.01)
*H04B 10/29* (2013.01)

(52) U.S. Cl.
CPC .......... *H04B 10/118* (2013.01); *H04B 10/11* (2013.01); *H04B 10/29* (2013.01)

(58) Field of Classification Search
None
See application file for complete search history.

(56) References Cited

U.S. PATENT DOCUMENTS 5,068,540 A * 11/1991 Tsuji ................. G01S 17/48
250/214 AG
5,465,170 A 11/1995 Arimoto
(Continued)

FOREIGN PATENT DOCUMENTS

GB 2180671 A * 4/1987 ........... F41G 7/2253

OTHER PUBLICATIONS

International Search Report and Written Opinion for Application No. PCT/US2017/029855 dated Aug. 1, 2017.

*Primary Examiner* — Kenneth N Vanderpuye
*Assistant Examiner* — Jai M Lee
(74) *Attorney, Agent, or Firm* — Botos Churhchill IP Law LLP

(57) ABSTRACT

The method includes receiving axis signals from a multi-axis position sensing detector, generating a reference signal by summing the axis signals, determining a mirror position of a mirror directing the optical beam based on the beam position error of each axis of the multi-axis position sensing detector, and actuating the mirror to move to the mirror position. Each axis signal is indicative of a beam position of an optical beam incident on the multi-axis position sensing detector, each axis signal corresponding to an axis of the multi-axis position sensing detector. For each axis of the multi-axis position sensing detector, the method includes converting a phase of an axis to have a 90 degree phase difference from a signal of the axis, generating an axis-phasor signal by summing the axis signals, and comparing the axis-phasor signal and the reference signal to determine a phase difference.

20 Claims, 13 Drawing Sheets

(56) References Cited

U.S. PATENT DOCUMENTS

| | | | |
|---|---|---|---|
| 5,973,310 A | 10/1999 | Lunscher | |
| 6,522,440 B1 | 2/2003 | Poon et al. | |
| 6,624,916 B1* | 9/2003 | Green | H04B 10/11 398/169 |
| 6,999,684 B2* | 2/2006 | Sato | G03B 3/00 396/135 |
| 7,711,441 B2* | 5/2010 | Tillotson | B60L 8/00 136/246 |
| 7,994,460 B2* | 8/2011 | Steinkraus, Jr. | H04B 10/1121 250/206.1 |
| 8,872,719 B2* | 10/2014 | Warnick | H01Q 21/061 343/853 |
| 9,917,645 B2* | 3/2018 | Steinkraus | H04B 10/29 |
| 2002/0131121 A1* | 9/2002 | Jeganathan | H04B 10/1127 398/128 |
| 2003/0026179 A1* | 2/2003 | Nagahara | G11B 7/0903 369/44.37 |
| 2003/0067657 A1* | 4/2003 | Dimmler | H04B 7/18506 398/129 |

* cited by examiner

PHASE SENSITIVE BEAM TRACKING SYSTEM

CROSS REFERENCE TO RELATED APPLICATIONS

This U.S. patent application is a continuation of, and claims priority under 35 U.S.C. § 120 from, U.S. patent application Ser. No. 15/163,745, filed on May 25, 2016, which is hereby incorporated by reference in its entirety.

TECHNICAL FIELD

This disclosure relates to phase sensitive beam tracking systems.

BACKGROUND

A communication network is a large distributed system for receiving information (signal) and transmitting the information to a destination. Over the past few decades the demand for communication access has dramatically increased. Although conventional wire and fiber landlines, cellular networks, and geostationary satellite systems have continuously been increasing to accommodate the growth in demand, the existing communication infrastructure is still not large enough to accommodate the increase in demand. Communication networks may seek to improve bandwidth and transmission range through the use of optical communications beams. The use of free space optical communication beams on earth may be problematic due to scintillation and pointing errors. Scintillation may be caused by atmospheric turbulence and beam size. Pointing errors include both static and dynamic from jitter, misalignment, building sway and vibration, platform motion and vibration, thermal expansion and more. The rapid changes caused by these pointing errors may elicit a need for a high precision, high speed beam tracking system.

SUMMARY

The present disclosure describes a tracking system that can convert covert a highly dynamic amplitude driven differential analog signal processing problem requiring normalization traditionally solved by analog or numerical division into a phase/timing problem that can be readily measured using digital electronics. In doing so the numerous errors generated by division are eliminated. In particular, the methods and systems described herein may measure position on a position sensor, which involves a precision measurement of the ratio of two signals down to 0.1%, while amplitudes of the signals are changing by many orders of magnitude.

One aspect of the disclosure provides a method for operating an optical beam tracking system for a communication beam. The method includes receiving, at signal processing hardware, axis signals from a multi-axis position sensing detector and generating, by the signal processing hardware, a reference signal by summing the axis signals. The method further includes determining, by the signal processing hardware, a mirror position of a mirror directing the optical beam based on the beam position error of each axis of the multi-axis position sensing detector and actuating, by the signal processing hardware, the mirror to move to the mirror position. Each axis signal is indicative of a beam position of an optical beam incident on the multi-axis position sensing detector. Moreover, each axis signal corresponds to an axis of the multi-axis position sensing detector. For each axis of the multi-axis position sensing detector, the method includes: i) converting, by the signal processing hardware, a phase of a first axis signal of the axis to have a 90 degree phase difference from a second axis signal of the axis; ii) generating, by the signal processing hardware, an axis-phasor signal by summing the first and second axis signals; and iii) comparing, by the signal processing hardware, the axis-phasor signal and the reference signal to determine a phase difference. The axis-phasor signal has an angle that maps to the beam position of the optical beam. The phase difference maps to a beam position error along the corresponding axis on the multi-axis position sensing detector.

Implementations of the disclosure may include one or more of the following optional features. In some implementations, the method includes receiving, at the signal processing hardware, photocurrents for each axis of the multi-axis position sensing detector, and converting, by at least one transimpedance amplifier of the signal processing hardware, the photocurrents to the corresponding axis signals, each axis signal being a voltage signal. Each photocurrent may have an amplitude dependent on a beam power and the beam position of the optical beam. The method may include high pass filtering each axis signal using at least one single or multi-pole filter of the signal processing hardware. The method may also include low pass filtering each axis-phasor signal using at least one single or multi-pole filter of the signal processing hardware. In some examples, the method includes modifying, by at least one limiting amplifier of the signal processing hardware, each axis-phasor signal and the reference signal to each represent a corresponding logarithmic gain.

In some implementations, the method includes filtering, by at least one comparator of the signal processing hardware, the modified axis-phasor signals and the modified reference signal to perform an edge detection on each of the modified axis-phasor signals and the modified reference signal. The method may also include synchronizing, by the signal processing hardware, the reference signal to a reference clock of the signal processing hardware. The method may also include trimming a frequency of the reference signal using a digital potentiometer of the signal processing hardware to account for latency and phase shift in any analog devices. The method may further include determining, by a closed loop controller (e.g., a proportional-integral-derivative (PID) controller) of the signal processing hardware, the mirror position in consideration of a rate of change of the mirror position based on the beam position error of at least one axis of the multi-axis position sensing detector. The method may also include filtering, by a notch filter in communication with the controller, the mirror position to attenuate a target frequency.

Another aspect of the disclosure provides a method for operating an optical beam tracking system for a communication beam. The method includes receiving, at signal processing hardware, a first X-signal, a second X-signal including an X-signal phase, a first Y-signal, and a second Y-signal including a Y-signal phase in relation to a beam position of an optical beam incident on a position sensing detector. The method includes shifting, by the signal processing hardware, the X-signal phase of the second X-signal by 90 degrees and shifting, by the signal processing hardware, the Y-signal phase of the second Y-signal by 90 degrees. The method further includes generating, by the signal processing hardware, i) a summed X-signal by summing the first X-signal and the shifted second X-signal, ii) a summed Y-signal by summing the first Y-signal and the shifted second Y-signal, and iii) a reference signal by summing the first X-signal, the second X-signal, first Y-signal and the second Y-signal. The method further includes determining, by the signal processing hardware, a mirror position of a mirror directing the optical beam. The mirror position is based on at least one of: a first signal difference between the reference signal and the summed X-signal; or a second signal difference between the reference signal and the summed Y-signal. The method includes actuating, by the signal processing hardware, the mirror to move to the mirror position.

This aspect may include one or more of the following optional features. The method includes receiving, at the signal processing hardware, a first X-photocurrent, a second X-photocurrent, a first Y-photocurrent, and a second Y-photocurrent. Each photocurrent has an amplitude dependent on a beam power and the beam position of the optical beam. The method may also include converting, by at least one transimpedance amplifier of the signal processing hardware, the first X-photocurrent, the second X-photocurrent, the first Y-photocurrent, and the second Y-photocurrent to the corresponding first X-signal, the second X-signal, the first Y-signal, and the second Y-signal, each signal being a voltage signal.

The method may also include high pass filtering, by at least one single or multi-pole filter of the signal processing hardware, the first X-signal, the second X-signal, the first Y-signal, and the second Y-signal. In some examples, the method includes modifying, by at least one limiting amplifier of the signal processing hardware, the summed X-signal, the summed Y-signal, and the reference signal to each represent a corresponding logarithmic gain. The modified summed X-signal, the modified summed Y-signal, and the modified reference signal may each be proportional to a logarithm of the corresponding summed X-signal, the corresponding summed Y-signal, and the corresponding reference signal. In some implementations, the method includes amplifying, by the signal processing hardware, the modified summed X-signal, the modified summed Y-signal, and the modified reference signal to each represent the corresponding logarithmic gain. The method may also include filtering, by at least one comparator of the signal processing hardware, the modified summed X-signal, the modified summed Y-signal, and the modified reference signal to perform an edge detection on each of the modified summed X-signal, the modified summed Y-signal, and the modified reference signal.

In some examples, the method includes trimming a frequency of the reference signal using a digital potentiometer of the signal processing hardware to account for latency and phase shift in any analog devices. In some examples, the method includes determining, by a controller (e.g., a PID controller) of the signal processing hardware, the mirror position in consideration of a rate of change of the mirror position based on at least one of the first signal difference or the second signal difference. The method may also include filtering, by a notch filter in communication with the controller, the mirror position to attenuate a target frequency Yet another aspect of the disclosure provides an optical beam tracking system. The system includes a position sensitive detector configured to output a first X-signal phase, a second X-signal including an X-signal, a first Y-signal, and a second Y-signal including a Y-signal phase in relation to a beam position of an optical beam incident on the position sensitive detector. At least one phase shifter is in communication with the position sensitive detector and configured to shift the X-signal phase of the second X-signal by 90 degrees and shift the Y-signal phase of the second Y-signal by 90 degrees. At least one summing amplifier is in communication with the position sensitive detector and the at least one phase shifter. The at least one summing amplifier is configured to output: a summed X-signal comprising a summation of the first X-signal and the shifted second X-signal; a summed Y-signal comprising a summation of the first Y-signal and the shifted second Y-signal; and a reference signal comprising a summation of the first X-signal, the second X-signal, first Y-signal, and the second Y-signal. The system also includes signal processing hardware in communication with the at least one summing amplifier and configured to determine a mirror position of a mirror directing the optical beam and actuate the mirror to move to the mirror position. The mirror position is based on at least one of a first signal difference between the reference signal and the summed X-signal or a second signal difference between the reference signal and the summed Y-signal.

This aspect may include one or more of the following optional features. The position sensitive detector may include: a first X-anode configured to output a first X-photocurrent; a second X-anode configured to output a second X-photocurrent; a first Y-anode configured to output a first Y-photocurrent; a second Y-anode configured to output a second Y-photocurrent. Each photocurrent is dependent on a beam power and the beam position of the optical beam. The position sensitive detector may also include at least one transimpedance amplifier in communication with the first X-anode, the second X-anode, the first Y-anode, and the second Y-anode. The at least one transimpedance amplifier may be configured to convert the first X-photocurrent, the second X-photocurrent, the first Y-photocurrent, and the second Y-photocurrent to the corresponding first X-signal, the second X-signal, the first Y-signal, and the second Y-signal, each signal being a voltage signal. In some examples, the system includes at least one single or multi-pole filter in communication with the position sensitive detector and configured to high-pass filter the first X-signal, the second X-signal, the first Y-signal, and the second Y-signal.

In some examples, the at least one phase shifter includes a first phase shifter configured to shift the X-signal phase of the second X-signal by 90 degrees and a second phase shifter configured to shift the Y-signal phase of the second Y-signal by 90 degrees. The at least one summing amplifier may include: a first summing amplifier in communication with the first phase shifter and configured to sum the first X-signal and the shifted second X-signal; a second summing amplifier in communication with the second phase shifter and configured to sum the first Y-signal and the shifted second Y-signal; and a third summing amplifier in communication with the position sensitive detector and configured to sum the first X-signal, the second X-signal, first Y-signal, and the second Y-signal. The system may also include at least one limiting amplifier in communication with the at least one summing amplifier. The at least one limiting amplifier may be configured to: i) receive the summed X-signal, the summed Y-signal, and the reference signal; modify the summed X-signal, the summed Y-signal, and the reference signal to each represent a logarithmic gain; and ii) output the modified summed X-signal, the modified summed Y-signal, and the modified reference signal. Each modified signal may be proportional to a logarithm of the corresponding received signal.

In some implementations, the system includes at least one comparator in communication with the at least one limiting amplifier. The at least one comparator may be configured to perform an edge detection on each of the modified summed X-signal, the modified summed Y-signal, and the modified reference signal. The system may further include a digital potentiometer in communication with the at least one comparator and configured to trim a frequency of the reference signal to account for latency and phase shift in any analog devices.

The signal processing hardware may include a controller (e.g., a PID controller configured to determine the mirror position in consideration of a rate of change of the mirror position based on at least one of the first signal difference or the second signal difference. In some examples, the system includes a notch filter in communication with the controller, the notch filter configured to filter the mirror position to attenuate a target frequency. The system may further include a mirror scaling calculator in communication with the controller, the mirror scaling calculator configured to generate complimentary first and second mirror signals that rotate away from a mirror bias set point.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
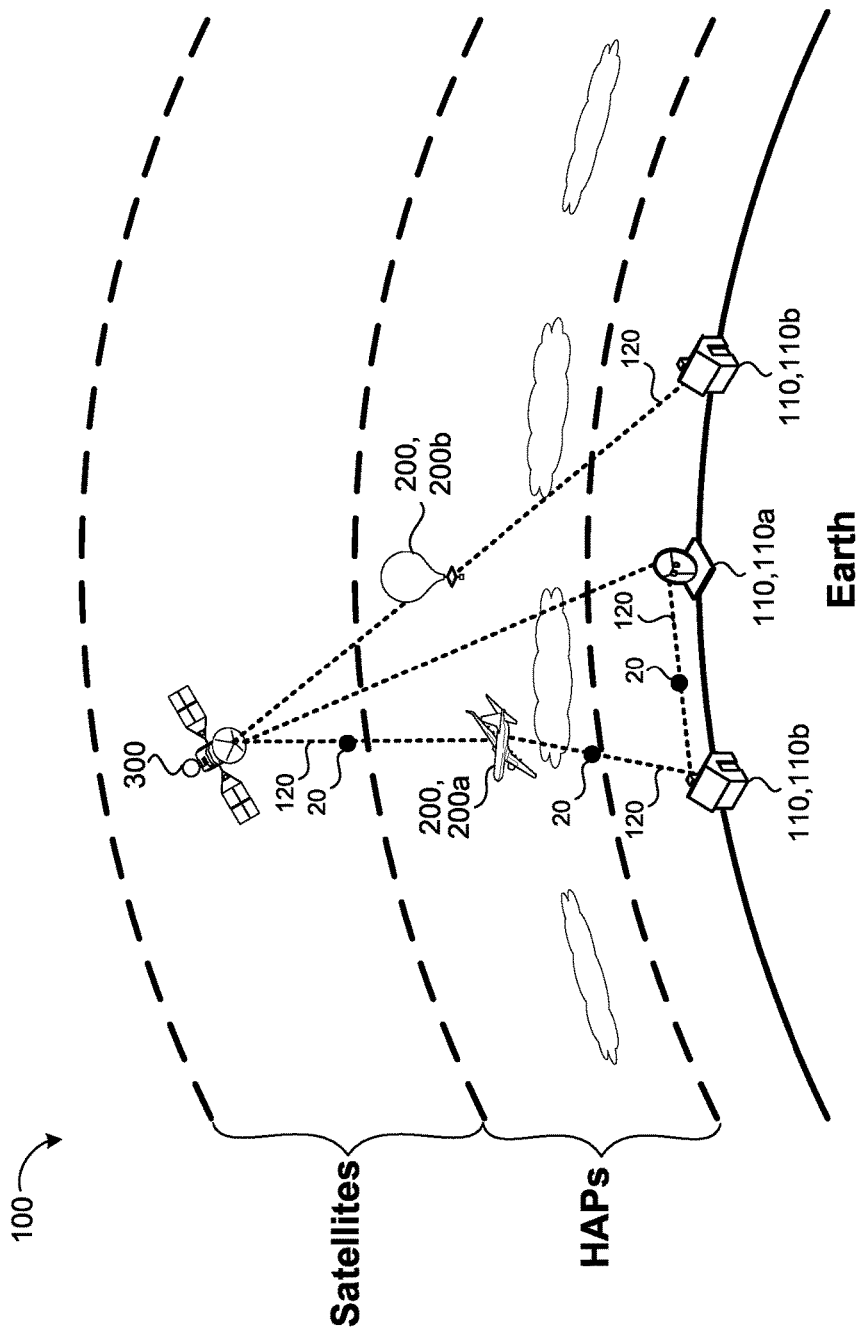
FIG. 1A is a schematic view of an exemplary communication system.

The present disclosure describes a beam tracking system for rapid alignment and correction of free space optical communication beams. Optical communication systems may transmit data through an optical communication beam. The optical communication beams may be subject to static and/or dynamic scintillation and pointing errors. The optical communication system may use a beam tracking system to track the optical communication beam and determine position and alignment corrections for the communication beams to correct for the scintillation and pointing errors. The beam tracking system that can convert a highly dynamic amplitude driven differential analog signal processing problem into a phase/timing problem that can be readily measured using digital electronics, rather than analog electronics or analog-to-digital converters. In particular, the beam tracking system may measure position on a position sensor, which involves a precision measurement of the ratio of two signals down to 0.1%, while amplitudes of the signals are changing by many orders of magnitude. A mirror may direct the communication beam based on the tracking of the optical communication beam by the beam tracking system.

The beam tracking system includes a multi-axis position sensitive detector configured to sense a position of a communication beam incident thereupon and output axis signals corresponding to the sensed position of the communication beam. The beam tracking system also includes signal processing hardware configured to condition the axis signals to convert the axis signals from an amplitude problem to a frequency problem by phase shifting the axis signals. The signal processing hardware further conditions the axis signals by increasing a gain of the axis signals and compensating for any rapid changes in beam power. The signal processing hardware determines a position error for each axis of the position sensitive detector by comparing the conditioned axis signal against a reference signal, which is a summation of all of the axis signals. Moreover, the signal processing hardware may optionally use a proportional-integral-derivative computation and a notch filter to improve the position error. A mirror scaling by the signal processing hardware may scale the position error to an appropriate value for operating the mirror and result in a mirror position signal. The signal processing hardware sends the mirror position signal to a mirror controller. The mirror controller may include digital to analog converter that converts the mirror position signal to a mirror signal to move the mirror. The mirror directs the communication beam onto the position sensitive detector. In some implementations, the mirror directs the position of the communication beam to one or more different optical communications systems.

Overview

Referring to FIGS. 1A-1D, in some implementations, a global-scale communication system 100 includes gateways 110 (e.g., source ground stations 110a and destination ground stations 110b), high altitude platforms (HAPs) or airborne base station 200, and satellites 300. High altitude platforms (HAPs) and airborne base stations 200 may be used interchangeably. The source ground stations 110a may communicate with the satellites 300, the satellites 300 may communicate with the airborne base stations 200, and the airborne base stations 200 may communicate with the destination ground stations 110b. In some examples, the source ground stations 110a also operate as linking-gateways between satellites 300. The source ground stations 110a may be connected to one or more service providers and the destination ground stations 110b may be user terminals (e.g., mobile devices, residential WiFi devices, home networks, etc.). In some implementations, an airborne base station 200 is an aerial communication device that operates at high altitudes (e.g., 17-22 km). The airborne base station may be released into the earth's atmosphere, e.g., by an air craft, or flown to the desired height. Moreover, the airborne base station 200 may operate as a quasi-stationary aircraft. In some examples, the airborne base station 200 is an aircraft 200a, such as an unmanned aerial vehicle (UAV); while in other examples, the airborne base station 200 is a communication balloon 200b. The satellite 300 may be in Low Earth Orbit (LEO), Medium Earth Orbit (MEO), or High Earth Orbit (HEO), including Geosynchronous Earth Orbit (GEO).

Figure 1B:
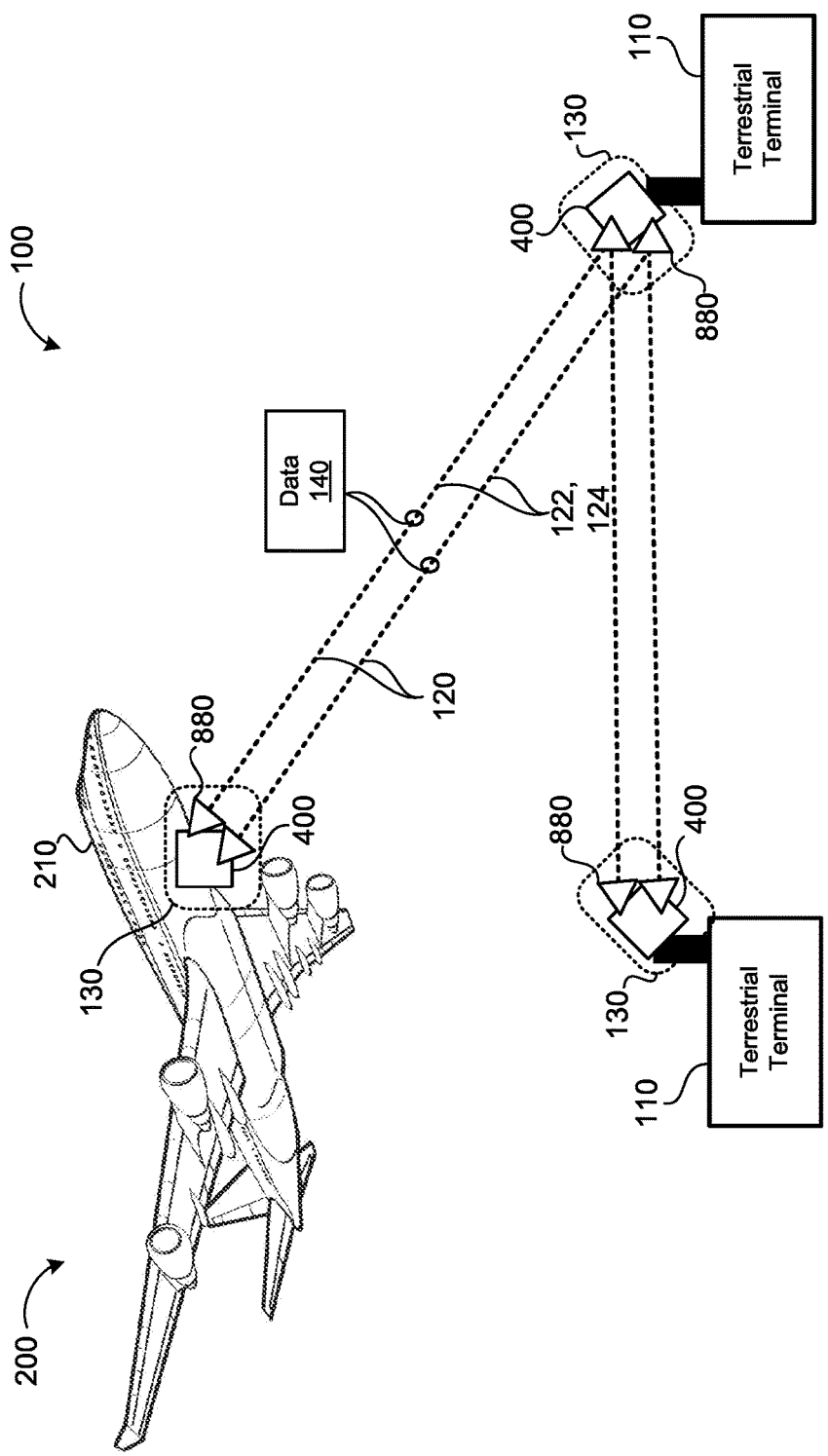
FIG. 1B is a schematic view of an exemplary communication system that includes an airborne base station and terrestrial terminals.
Figure 1C:
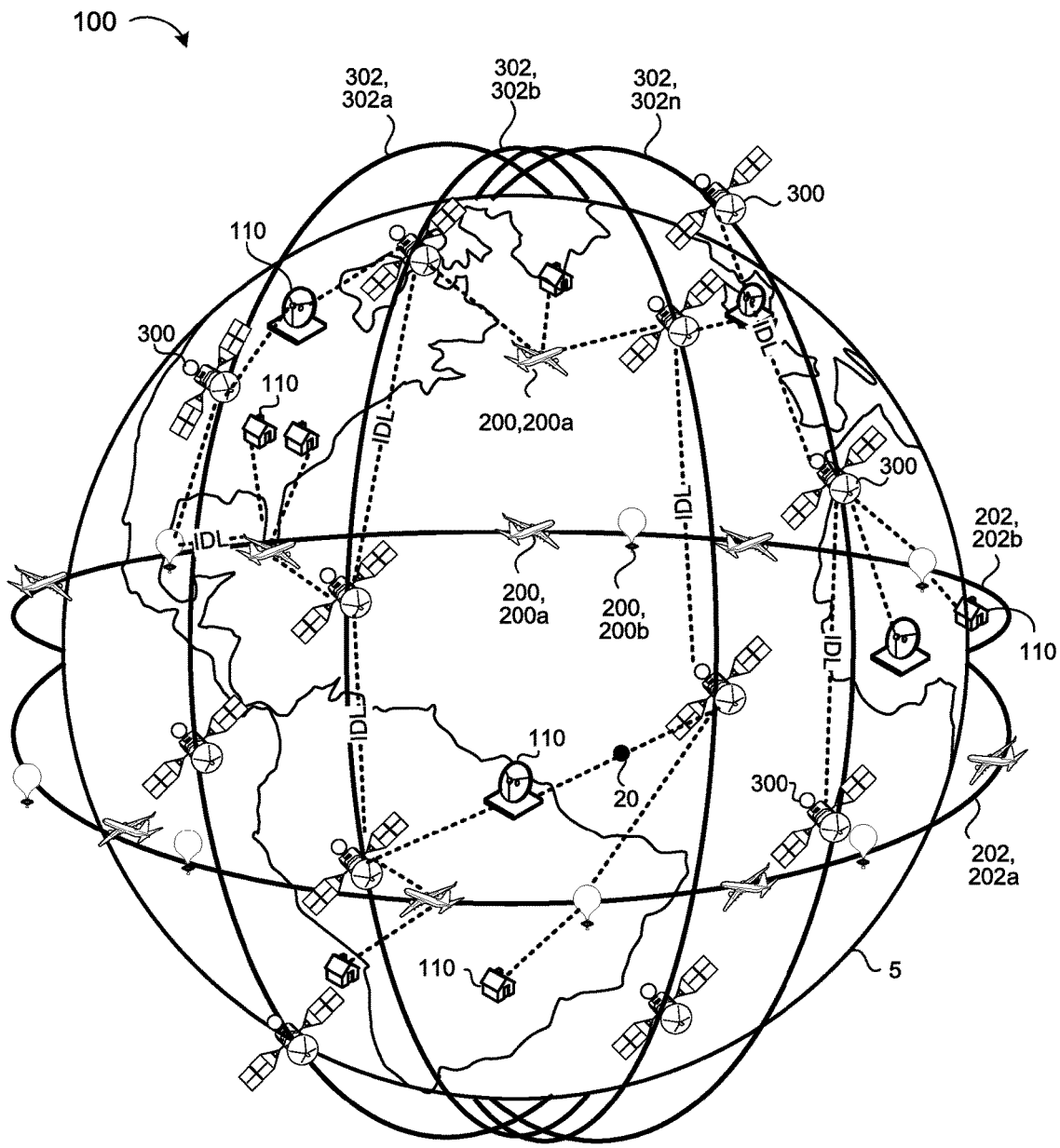
FIG. 1C is a schematic view of an exemplary global-scale communication system with satellites and communication balloons, where the satellites form a polar constellation.
Figure 1D:
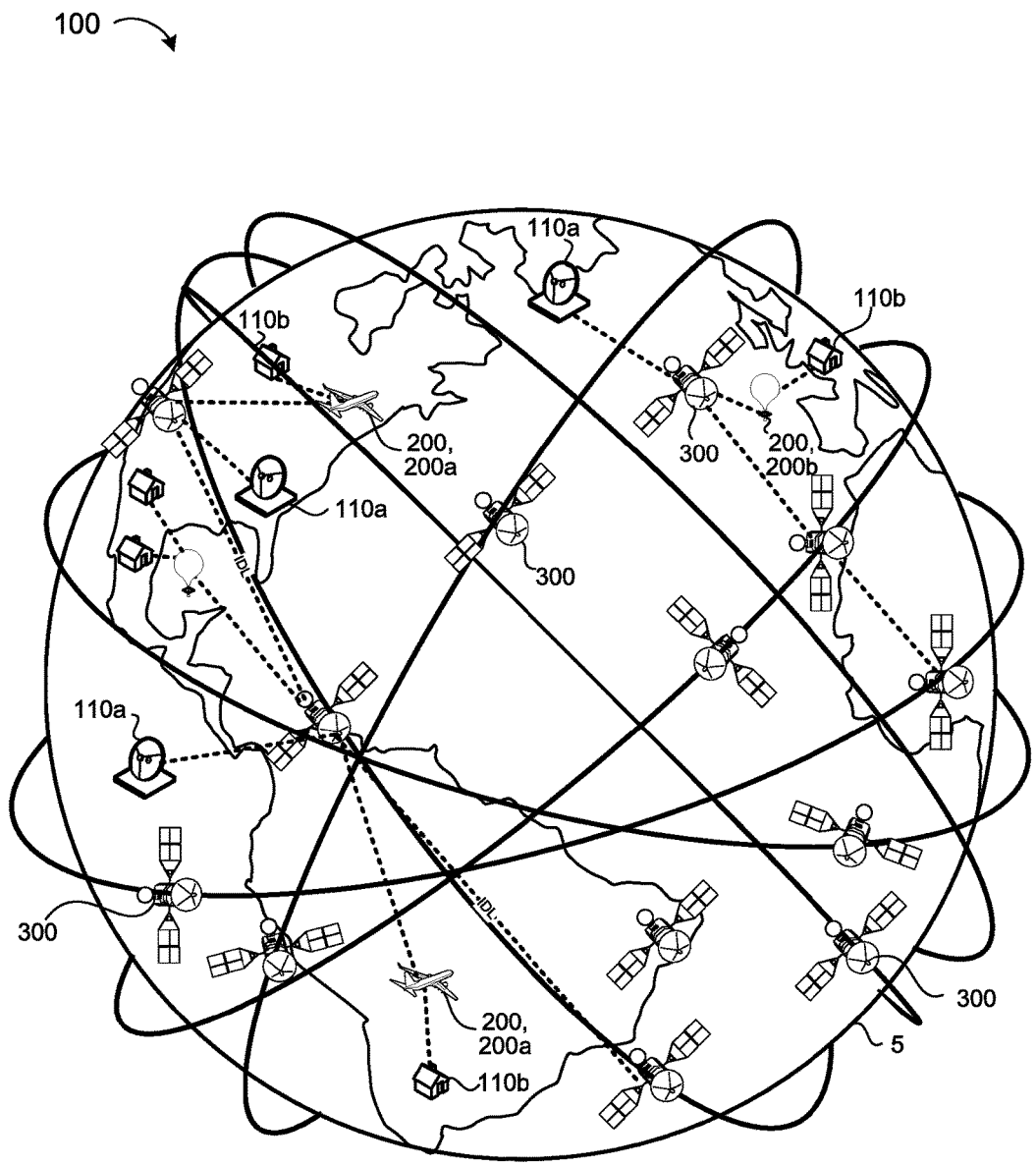
FIG. 1D is a schematic view of an exemplary group of satellites of FIG. 1A forming a Walker constellation.

FIG. 1B provides a schematic view of an exemplary architecture of a communication system 100 establishing a communication link via an optical communication beam 120 of an optical communication system 130. The optical communication system 130 facilitates communication, via the optical communication beam 120, between an airborne base station 200 and one or more terrestrial terminals 110 (e.g., gateways 110). The terrestrial terminals 110 may be in communication with each other via the optical communication beam 120. The optical communication beam 120 may include a beam position 122 as a reference to its location and a beam power 124 as a reference to its strength.

In some examples, the airborne base station 200 is an unmanned aerial system (UAS). In the example shown, the airborne base station 200 includes a body 210 that supports an optical communication system 130. The optical communication system 130 may transmit or receive multiple optical communication beams 120 via one or more optical communication systems 130. A single optical communication system 130 may transmit multiple optical communication beams 120 or multiple optical communication systems 130 may each transmit a corresponding optical communication beam 120 or a combination thereof. The optical communication system 130 may include a transceiver, a beam emitter, a beam receiver, and a system for sending and receiving data through the optical communication beam 120.

The use of optical communication beams 120 on earth 5 may be problematic due to scintillation and pointing errors. Scintillation may be caused by atmospheric turbulence and beam size. Static and/or dynamic pointing errors may result from jitter, misalignment, building sway and vibration, platform motion and vibration, thermal expansion, etc.

The optical communication system 130 may include a beam tracking system 400 configured to track a position/alignment of an optical communication beam 120 and adjust a mirror 880 directing the optical communication beam 120 to compensate for any position/alignment errors. The beam tracking system 400 may ensure that the optical communication beam 120 remains in communication with the intended optical communication system 130, such as a terrestrial terminal 110 or an airborne base station 200. The optical communication system 130 may transmit data 140 via the optical communication beam 120 to the terrestrial terminal 110, airborne base station 200, or satellites 300. The beam tracking system 400 compensates for effects of any scintillation and pointing errors through rapid adjustment of the mirror 880 to adjust the beam position 122, ensuring that the beam position 122 remains in contact with another optical communication system 130.

In some examples, the terrestrial terminal 110 includes an optical communication system 130 configured to communicate with the airborne base station 200 or the satellite 300. Similarly, the airborne base station 200 and the satellite 300 may each include an optical communication system 130. Each optical communication system 130 may include a dedicated beam tracking system 400 or multiple optical communication systems 130 may communicate with a shared beam tracking system 400.

The airborne base station 200 may communicate various data 140 and information to the terrestrial terminal 110, such as, but not limited to, airspeed, heading, attitude position, temperature, GPS (global positioning system) coordinates, wind conditions, flight plan information, fuel quantity, battery quantity, data received from other sources, data received from other antennas, sensor data, etc. Similarly, the terrestrial terminal 110 may communicate to the airborne base station 200 various data 140 and information including data to be forwarded to other terrestrial terminals 110 or to other data networks. The airborne base station 200 may be various implementations of flying craft, including a combination of, but not limited to, an airplane, an airship, a helicopter, a gyrocopter, a blimp, a multi-copter, a glider, a balloon, a fixed wing, a rotary wing, a rotor aircraft, a lifting body, a heavier-than-air craft, a lighter-than-air craft, etc.

The airborne base stations 200 may move about the earth 5 along a path, trajectory, or orbit 202 (also referred to as a plane, since their orbit or trajectory may approximately form a geometric plane). Moreover, several airborne base stations 200 may operate in the same or different orbits 202. For example, some airborne base stations 200 may move approximately along a latitude of the earth 5 (or in a trajectory determined in part by prevailing winds) in a first orbit 202a, while other airborne base stations 200 may move along a different latitude or trajectory in a second orbit 202b. The airborne base stations 200 may be grouped amongst several different orbits 202 about the earth 5 and/or they may move along other paths 202 (e.g., individual paths). Similarly, the satellites 300 may move along different orbits 302, 302a-n. Multiple satellites 300 working in concert form a satellite constellation. The satellites 300 within the satellite constellation may operate in a coordinated fashion to overlap in ground coverage. In the example shown in FIG. 1C, the satellites 300 operate in a polar constellation by having the satellites 300 orbit the poles of the earth 5; whereas, in the example shown in FIG. 1D, the satellites 300 operate in Walker constellation, which covers areas below certain latitudes and provides a larger number of satellites 300 simultaneously in view of a gateway 110 on the ground (leading to higher availability, fewer dropped connections).

Figure 2B:
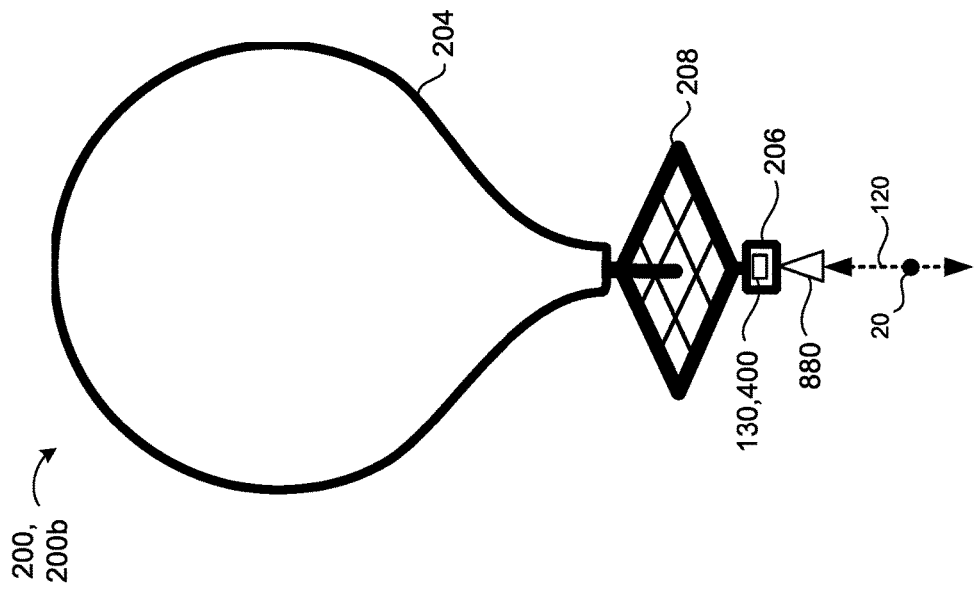
FIGS. 2A and 2B are perspective views of example airborne base stations.
Figure 2A:
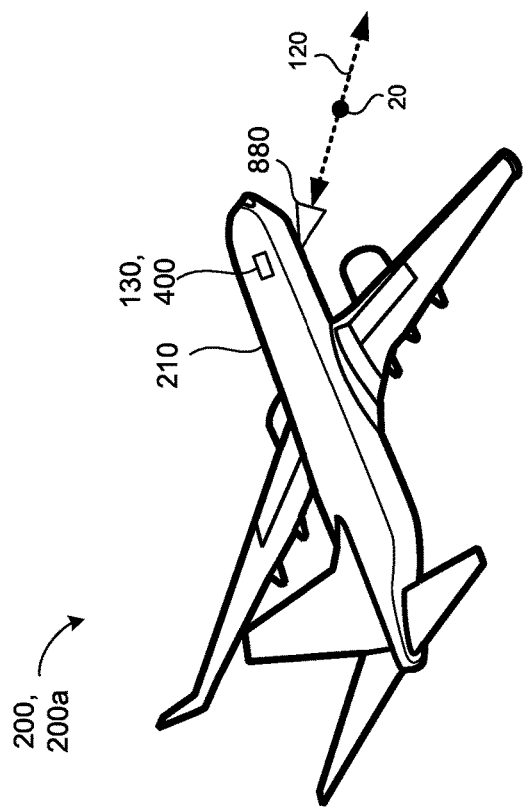

Referring to FIGS. 1B, 2A, and 2B, in some implementations, the airborne base station 200 includes an airborne base station body 210 and an optical communication system 130 disposed on the airborne base station body 210. The optical communication system 130 of the airborne base station 200 may be configured to receive a communication 20 from a satellite 300 via a corresponding optical communication beam 120 and reroute the communication 20 to a destination ground station 110b via a corresponding optical communication beam 120 and vice versa. The optical communication system 130 of the airborne base station 200 may process the received communication 20 and determine a path of the communication 20 to arrive at the destination ground station 110b (e.g., a user terminal). In some implementations, terrestrial terminals 110b on the ground have specialized antennas or optical emitters that send communication signals to the airborne base stations 200. The airborne base station 200 receiving the communication 20 may send the communication 20 to another airborne base station 200, to a satellite 300, or to a gateway 110 (e.g., a terrestrial terminal 110b).

FIG. 2B illustrates an example communication balloon 200b that includes a balloon 204 (e.g., sized about 49 feet in width and 39 feet in height and filled with helium or hydrogen), an equipment box 206 as an airborne base station body 210, and solar panels 208. The equipment box 206 includes a data processing device and/or the optical communication system 130 that executes algorithms to determine where the high-altitude balloon 200b needs to go, then each high-altitude balloon 200b moves into a layer of wind blowing in a direction that may take it where it should be going. The optical communication system 130 may include a beam tracking system 400 and a mirror 880 to direct the corresponding communication beam 120. The equipment box 206 also includes batteries to store power and a transceiver (e.g., antennas or optical emitters) to communicate with other devices (e.g., other airborne base stations 200, satellites 300, gateways 110, such as terrestrial terminals 110b, internet antennas on the ground, etc.). The solar panels 208 may power the equipment box 206.

Communication balloons 200b are typically released in to the earth's stratosphere to attain an altitude between 11 to 23 miles and provide connectivity for a ground area of 25 miles in diameter at speeds comparable to terrestrial wireless data services (such as, 3G or 4G). The communication balloons 200b float in the stratosphere at an altitude twice as high as airplanes and the weather (e.g., 20 km above the earth's surface). The high-altitude balloons 200b are carried around the earth 5 by winds and can be steered by rising or descending to an altitude with winds moving in the desired direction. Winds in the stratosphere are usually steady and move slowly at about 5 and 20 mph, and each layer of wind varies in direction and magnitude.

Figure 3:
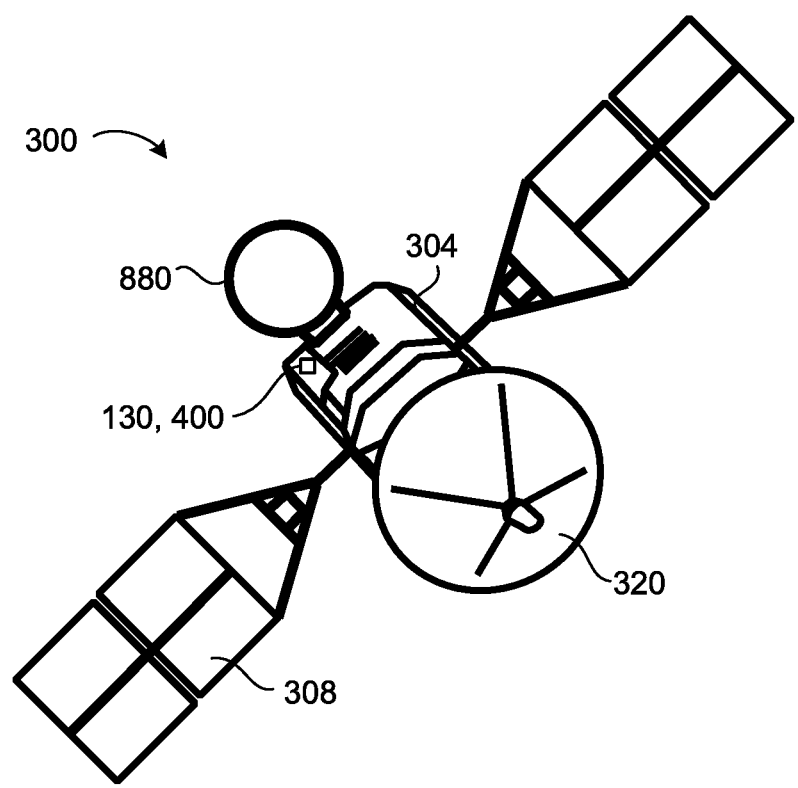
FIG. 3 is a perspective view of an example satellite.

Referring to FIG. 3, a satellite 300 is an object placed into orbit 302 around the earth 5 and may serve different purposes, such as military or civilian observation satellites, communication satellites, navigations satellites, weather satellites, and research satellites. The orbit 302 of the satellite 300 varies depending in part on the purpose of the satellite 300. Satellite orbits 302 may be classified based on their altitude from the surface of the earth 5 as Low Earth Orbit (LEO), Medium Earth Orbit (MEO), and High Earth Orbit (HEO). LEO is a geocentric orbit (i.e., orbiting around the earth 5) that ranges in altitude from 0 to 1,240 miles. MEO is also a geocentric orbit that ranges in altitude from 1,200 mile to 22,236 miles. HEO is also a geocentric orbit and has an altitude above 22,236 miles. Geosynchronous Earth Orbit (GEO) is a special case of HEO. Geostationary Earth Orbit (GSO, although sometimes also called GEO) is a special case of Geosynchronous Earth Orbit.

In some implementations, the satellite 300 includes a satellite body 304 having a data processing device and/or an optical communications system 130, e.g., similar to the data processing device or optical communications system 130 of the airborne base stations 200. The data processing device and/or optical communications system 130 executes algorithms to determine where the satellite 300 is heading. The optical communication system 130 may include a beam tracking system 400 and a mirror 880 to direct the corresponding communication beam 120. The satellite 300 also includes an antenna or optical emitter 320 for receiving and transmitting a communication 20. The satellite 300 includes solar panels 308 mounted on the satellite body 304 for providing power to the satellite 300. In some examples, the satellite 300 includes rechargeable batteries used when sunlight is not reaching and charging the solar panels 308.

When constructing a global-scale communications system 100 using airborne base stations 200, it is sometimes desirable to route traffic over long distances through the communication system 100 by linking airborne base stations 200 to satellites 300 and/or one airborne base station 200 to one another. For example, two satellites 300 may communicate via inter-device links and two airborne base stations 200 may communicate via inter-device links. Inter-device link (IDL) eliminates or reduces the number of airborne base stations 200 or satellites 300 to gateway 110 hops, which decreases the latency and increases the overall network capabilities. Inter-device links allow for communication traffic from one airborne base station 200 or satellite 300 covering a particular region to be seamlessly handed over to another airborne base station 200 or satellite 300 covering the same region, where a first airborne base station 200 or satellite 300 is leaving the first area and a second airborne base station 200 or satellite 300 is entering the area. Such inter-device linking is useful to provide communication services to areas far from source and destination ground stations 110a, 110b and may also reduce latency and enhance security (fiber optic cables may be intercepted and data going through the cable may be retrieved). This type of inter-device communication is different than the "bent-pipe" model, in which all the signal traffic goes from a source ground station 110a to a satellite 300, and then directly down to a destination ground station 110b (e.g., terrestrial terminal) or vice versa. The "bent-pipe" model does not include any inter-device communications. Instead, the satellite 300 acts as a repeater. In some examples of "bent-pipe" models, the signal received by the satellite 300 is amplified before it is re-transmitted; however, no signal processing occurs. In other examples of the "bent-pipe" model, part or all of the signal may be processed and decoded to allow for one or more of routing to different beams, error correction, or quality-of-service control; however no inter-device communication occurs.

In some implementations, large-scale communication constellations are described in terms of a number of orbits 202, 302, and the number of airborne base stations 200 or satellites 300 per orbit 202, 302. Airborne base stations 200 or satellites 300 within the same orbit 202, 302 maintain the same position relative to their intra-orbit airborne base station 200 or satellite 300 neighbors. However, the position of an airborne base station 200 or a satellite 300 relative to neighbors in an adjacent orbit 202, 302 may vary over time. For example, in a large-scale satellite constellation with near-polar orbits, satellites 300 within the same orbit 202 (which corresponds roughly to a specific latitude, at a given point in time) maintain a roughly constant position relative to their intra-orbit neighbors (i.e., a forward and a rearward satellite 300), but their position relative to neighbors in an adjacent orbit 302 varies over time. A similar concept applies to the airborne base stations 200; however, the airborne base stations 200 move about the earth 5 along a latitudinal plane and maintain roughly a constant position to a neighboring airborne base station 200.

A source ground station 110a may be used as a connector between satellites 300 and the Internet, or between airborne base stations 200 and terrestrial terminals 110b. In some examples, the system 100 utilizes the source ground station 110a as linking-gateways 110a for relaying a communication 20 from one airborne base station 200 or satellite 300 to another airborne base station 200 or satellite 300, where each airborne base station 200 or satellite 300 is in a different orbit 202, 302. For example, the linking-gateway 110a may receive a communication 20 from an orbiting satellite 300, process the communication 20, and switch the communication 20 to another satellite 300 in a different orbit 302. Therefore, the combination of the satellites 300 and the linking-gateways 110a provide a fully-connected system 100. For the purposes of further examples, the gateways 110 (e.g., source ground stations 110a and destination ground stations 110b), shall be referred to as terrestrial terminals 110.

Beam Tracking System

Figure 4:
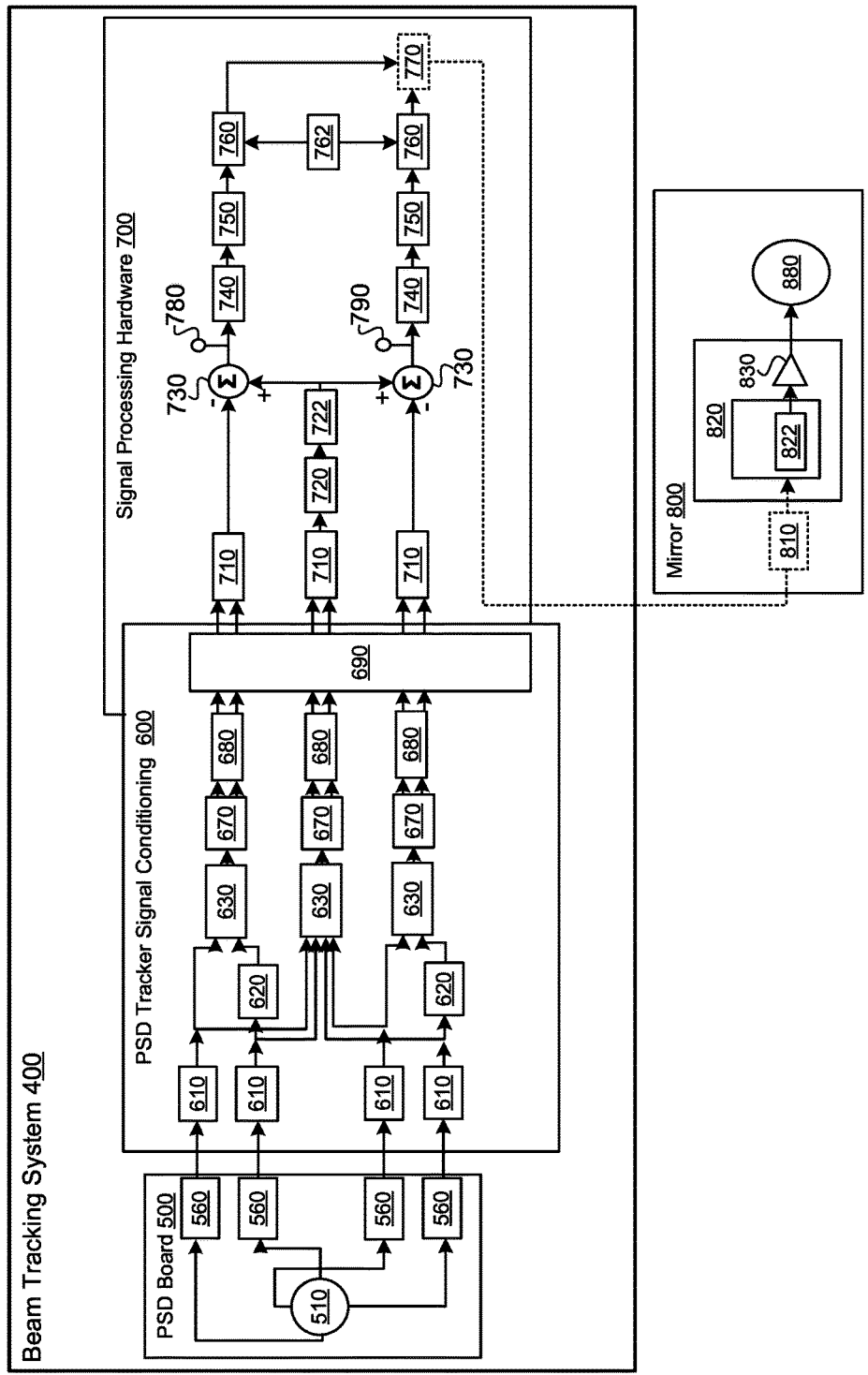
FIG. 4 is a schematic view of a beam tracking system.

FIG. 4 displays a schematic view of an example beam tracking system 400. The beam tracking system 400 includes a multi-axis position sensing detector system 500 configured to accept an optical communication beam 120 and report the beam position 122 of the optical communication beam 120 on the multi-axis position sensing detector system 500. The beam tracking system 400 also includes signal conditioning system 600 is in communication with the multi-axis position sensing detector system 500 and signal processing hardware 700 in communication with the signal conditioning system 600. The signal conditioning system 600 conditions signals received from the multi-axis position sensing detector system 500. A mirror control system 800 may in communication with the signal processing hardware 700. The mirror control system 800 may move a mirror 880 in response to an angle output by the signal processing hardware 700. The beam tracking system 400, the multi-axis position sensing detector system 500, the signal conditioning system 600, the signal processing hardware 700, and the mirror control system 800 may be implemented on a single circuit board or as separate boards in communication with each other.

Figure 5:
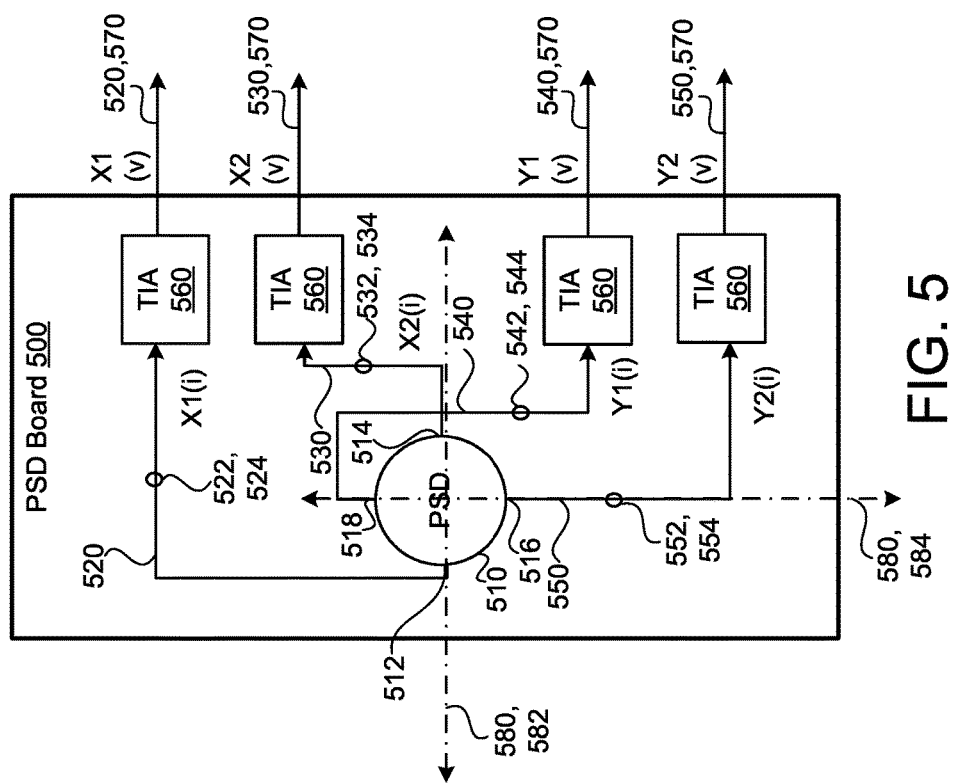
FIG. 5 is a schematic view of the photosensitive detector system.

FIG. 5 is a schematic view of an example position multi-axis position sensing detector system 500. The multi-axis position sensing detector system 500 includes a multi-axis position sensing detector 510 (e.g., one or more photodiodes). The multi-axis position sensing detector 510 may output one or more signals in response to an optical communication beam 120 incident on the multi-axis position sensing detector 510. In some examples, the multi-axis position sensing detector 510 is oriented on a grid and outputs one or two signals per axis 580. The multi-axis position sensing detector 510 may include a first axis 580, 582 corresponding to an X-axis 582 and a second axis 580, 584 corresponding to a Y-axis 584. The multi-axis position sensing detector 510 may output an amplitude and a phase in response to the beam position 122 and the beam power 124 of the optical communication beam 120 impacting the multi-axis position sensing detector 510. The multi-axis position sensing detector 510 may include a first X-anode 512 and a second X-anode 514 corresponding to the X-axis 582. The first X-anode 512 and the second X-anode 514 may output a first X-axis signal 520 and a second X-axis signal 530, respectively. The multi-axis position sensing detector 510 may include a first Y-anode 516 and a second Y-anode 518 corresponding to the Y-axis 584. The first Y-anode 516 and the second Y-anode 518 may output a first Y-axis signal 540 and a second Y-axis signal 550, respectively. The first X-axis signal 520 may include a first X-axis phase 522 and a first X-axis amplitude 524 representative of the phase and amplitude of the first X-axis signal 520, respectively. The second X-axis signal 530 may include a second X-axis phase 532 and a second X-axis amplitude 534 representative of the phase and amplitude of the second X-axis signal 530, respectively. The first Y-axis signal 540 may include a first Y-axis phase 542 and a first Y-axis amplitude 544 representative of the phase and amplitude of the first Y-axis signal 540, respectively. The second Y-axis signal 550 may include a second Y-axis phase 552 and a second Y-axis amplitude 554 representative of the phase and amplitude of the second Y-axis signal 550, respectively.

In at least one example, the optical communication beam 120 may impact the multi-axis position sensing detector 510 closer to the first X-anode 512 and the first Y-anode 516. The first X-anode 512, the second X-anode 514, the first Y-anode 516, and the second Y-anode 518 may output the first X-axis signal 520, the second X-axis signal 530, the first Y-axis signal 540, and the second Y-axis signal 550, respectively. The first X-axis signal amplitude 524 may be higher than the second X-axis signal amplitude 534 and the first Y-axis signal amplitude 544 may be higher than the second Y-axis signal amplitude 554 in response to the position of the optical communication beam 120 impacting the multi-axis position sensing detector 510. The strength of the optical communication beam 120 impacting the multi-axis position sensing detector 510 may result in a different total amplitude for the first X-axis signal amplitude 524, the second X-axis signal amplitude 534, the first Y-axis signal amplitude 544, and the second Y-axis signal amplitude 554. In some implementations, the multi-axis position sensing detector 510 outputs a current change in response to how the optical communication beam 120, the beam position 122, and beam power 124 impact the multi-axis position sensing detector 510 for the first X-axis signal 520, the second X-axis signal 530, the first Y-axis signal 540, and the second Y-axis signal 550. When the multi-axis position sensing detector 510 outputs a current in response to the optical communication beam 120, a transimpedance amplifier 560 may convert the first X-axis signal 520, the second X-axis signal 530, the first Y-axis signal 540, and the second Y-axis signal 550 to voltage based signals like the first X-axis amplitude 524, the second X-axis amplitude 534, the first Y-axis amplitude 544, and the second Y-axis amplitude 554, respectively. When there is not a transimpedance amplifier 560, the multi-axis position sensing detector 510 may output a first X-photocurrent 520, a second X-photocurrent 530, a first Y-photocurrent 540, and a second Y-photocurrent 550 corresponding to the first X-axis signal 520, the second X-axis signal 530, the first Y-axis signal 540, the second Y-axis signal 550, respectively, and may be used interchangeably depending on if a transimpedance amplifier 560 may be included. The first X-axis signal 520, the second X-axis signal 530, the first Y-axis signal 540, the second Y-axis signal 550, the first X-axis signal amplitude 524, the second X-axis signal amplitude 534, the first Y-axis signal amplitude 544 and, the second Y-axis signal amplitude 554, the first X-axis signal phase 522, the second X-axis signal phase 532, the first Y-axis signal phase 542, and the second Y-axis signal phase 552 may be output from the position multi-axis position sensing detector system 500 by a multi-axis position sensing detector system output 570. The multi-axis position sensing detector system output 570 may be connected to the signal conditioning system 600. The multi-axis position sensing detector system output 570 may be any connection suitable for transmitting the required data, amplitude, phases or voltages of the signal(s).

Figure 6:
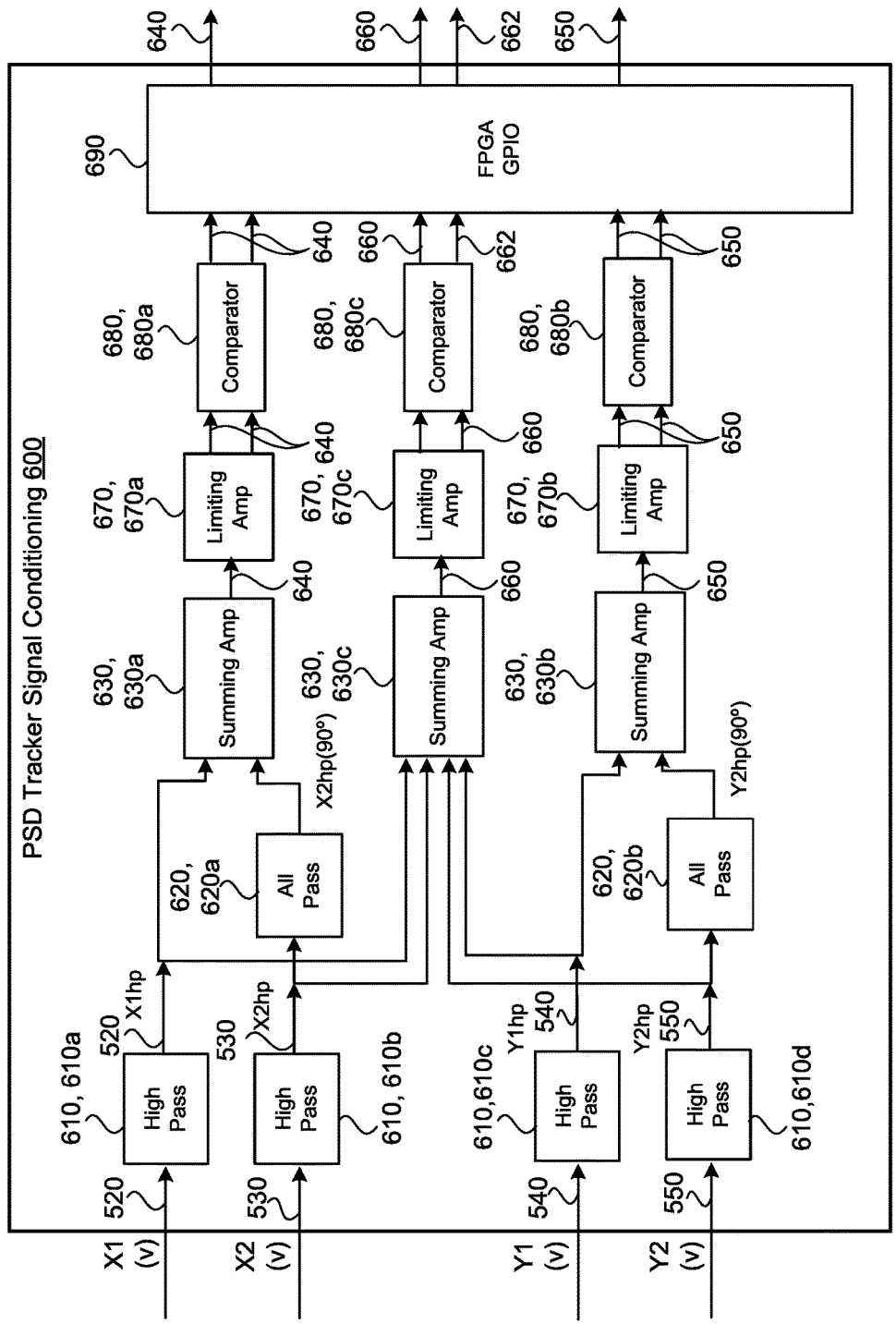
FIG. 6 is a schematic view of a signal conditioning system.

FIG. 6 is a schematic view of an example signal conditioning system 600. The first X-axis signal 520, the second X-axis signal 530, the first Y-axis signal 540, and the second Y-axis signal 550 enter the signal conditioning system 600. In the example shown, the first X-axis signal 520 having the first X-axis phase 522 and the first X-axis amplitude 524 enters a first high pass filter 610, 610a. Similarly, the second X-axis signal 530 having the second X-axis phase 532 and the second X-axis amplitude 534 enter a second high pass filter 610, 610b. Also, in the example shown, the first Y-axis signal 540 having the first Y-axis phase 542 and the first Y-axis amplitude 544 enter a third high pass filter 610, 610c. Similarly, the second Y-axis signal 550 having the second Y-axis phase 552 and the second Y-axis amplitude 524 enter a fourth high pass filter 610, 610d. In some implementations, the first, second, third, and fourth high pass filters 610, 610a-d are a combined as a single shared high pass filter 610. The high pass filter(s) 610 may serve to filter out high frequency noise or interference on the respective signals. In some examples, the high pass filter 610 is a high pass filter to limit any DC contributions in the signals that the high-pass filter 610 filters.

In some implementations, a first all-pass filter 620, 620*a* receives the second X-axis signal 530 and shifts the second X-axis phase 532 by 90 degrees. A first summing amplifier 630, 630*a* receives the first X-axis signal 520 and the phase-shifted second X-axis signal 530 and adds the first X-axis signal 520 to the phase-shifted second X-axis signal 530, resulting in a phasor X-axis signal 640. The first summing amplifier 630, 630*a* may contribute a low-pass response to band limit the signal. By adding the first X-axis signal 520 to the phase-shifted second X-axis signal 530, only an amplitude representative of the offset of the optical communication beam 120 from the multi-axis position sensing detector 510 remains. Any differences in phase and equal amplitude may result in the signal cancelling each other out completely. Any differences in phase and/or amplitude may result in a signal remaining as the phasor X-axis signal 640.

A first limiting amplifier 670, 670*a* may receive the phasor X-axis signal 640 and changes or alters the phasor X-axis signal 640 to maintain a logarithmic gain. The logarithmic gain allows for large changes in amplitude to be altered to a manageable level while still allowing for control of the beam tracking system 400 and increasing the dynamic range of the beam tracking system 400. The first limiting amplifier 670, 670*a* may provide a gain to limit the effects of scintillation.

A first comparator 680, 680*a* may receive the phasor X-axis signal 640 and provide edge detection to identify edges and any alteration of the phasor X-axis signal 640. The first comparator 680, 680*a* may level shift the phasor X-axis signal 640 to a 3.3 volt signal. The first comparator 680, 680*a* may also provide a low pass filter to limit high frequency chatter. The phasor X-axis 640 may optionally exit the signal conditioning system 600 at a connector 690 or a general purpose input output (GPIO) port to enter the signal processing hardware 700.

In some implementations, a second all-pass filter 620, 620*b* receives the second Y-axis signal 550 and shifts the second Y-axis signal phase 532 by 90 degrees. A second summing amplifier 630, 630*b* receives the first Y-axis signal 540 and the phase-shifted second Y-axis signal 550 and adds the first Y-axis signal 540 to the phase-shifted second Y-axis signal 550, resulting in a phasor Y-axis signal 650. The second summing amplifier 630, 630*b* may contribute a low pass response to band limit the signal. By adding the first Y-axis signal 540 and the phase-shifted second Y-axis signal 550, only an amplitude representative of the offset of the optical communication beam 120 from the multi-axis position sensing detector 510 remains. Any differences in phase and equal amplitude may result in the signal cancelling each other out completely. Any differences in phase and/or amplitude may result in a signal remaining as the phasor Y-axis signal 650.

A second limiting amplifier 670, 670*b* receives the phasor Y-axis signal 650 and changes or alters the phasor Y-axis signal 650 to maintain a logarithmic gain. The logarithmic gain allows for large changes in amplitude to be altered to a manageable level, while still allowing for control of the system and increasing the dynamic range of the system. The second limiting amplifier 670, 670*b* may provide a gain to limit the effects of scintillation.

A second comparator 680, 680*b* may receive the phasor Y-axis signal 650 to provide edge detection to identify any edges and the alteration of the phasor Y-axis signal 650. The second comparator 680, 680*b* may level shift the phasor Y-axis signal 650 to a 3.3 volt signal. Moreover, the second comparator 680, 680*b* may also provide a low-pass filter to limit high frequency chatter. The phasor Y-axis signal 650 may exit the signal conditioning system 600 at a connector 690 or a general purpose input output port to enter the signal processing hardware 700.

A third summing amplifier 630, 630*c* receives and sums the first X-axis signal 520, the second X-axis signal 530, the first Y-axis signal 540, the second Y-axis signal 550 to output a reference signal 660. The third summing amplifier 630, 630*c* may serve to combine the first X-axis signal 520, the second X-axis signal 530, the first Y-axis signal 540, and the second Y-axis signal 550. Moreover, the third summing amplifier 630, 630*c* may contribute a low-pass filter. The respective phase or amplitude of the signals 520, 530, 540, 550 serves to represent the total amplitude of the optical communication beam 120 impacting the multi-axis position sensing detector 510 and also serves to provide a reference position for a total offset of the optical communication beam 120 from a center of the multi-axis position sensing detector 510.

A third limiting amplifier 670, 670*c* receives the reference signal 660. The third limiting amplifier 670, 670*c* is configured to change or alter the reference signal 660 to maintain a logarithmic gain. The logarithmic gain allows for large changes in amplitude to be altered to a manageable level, while still allowing for control of the system and increasing the dynamic range of the system. A third comparator 680, 680*c* receives the reference signal 660 from the third limiting amplifier 670, 670*c*. The third comparator 680, 680*c* may provide edge detection to identify edges, zero crossing, and/or the alteration of the reference signal 660. The reference signal 660 may exit the signal conditioning system 600 at a connector 690 or a general purpose input output port to enter the signal processing hardware 700. The third comparator 680, 680*c* may also output an optically received clock 662 based on the reference signal 660. In some examples, the third comparator 680, 680*c* determines the optically received clock 662 based on the zero crossing detector of the third comparator 680, 680*c*.

Figure 7:
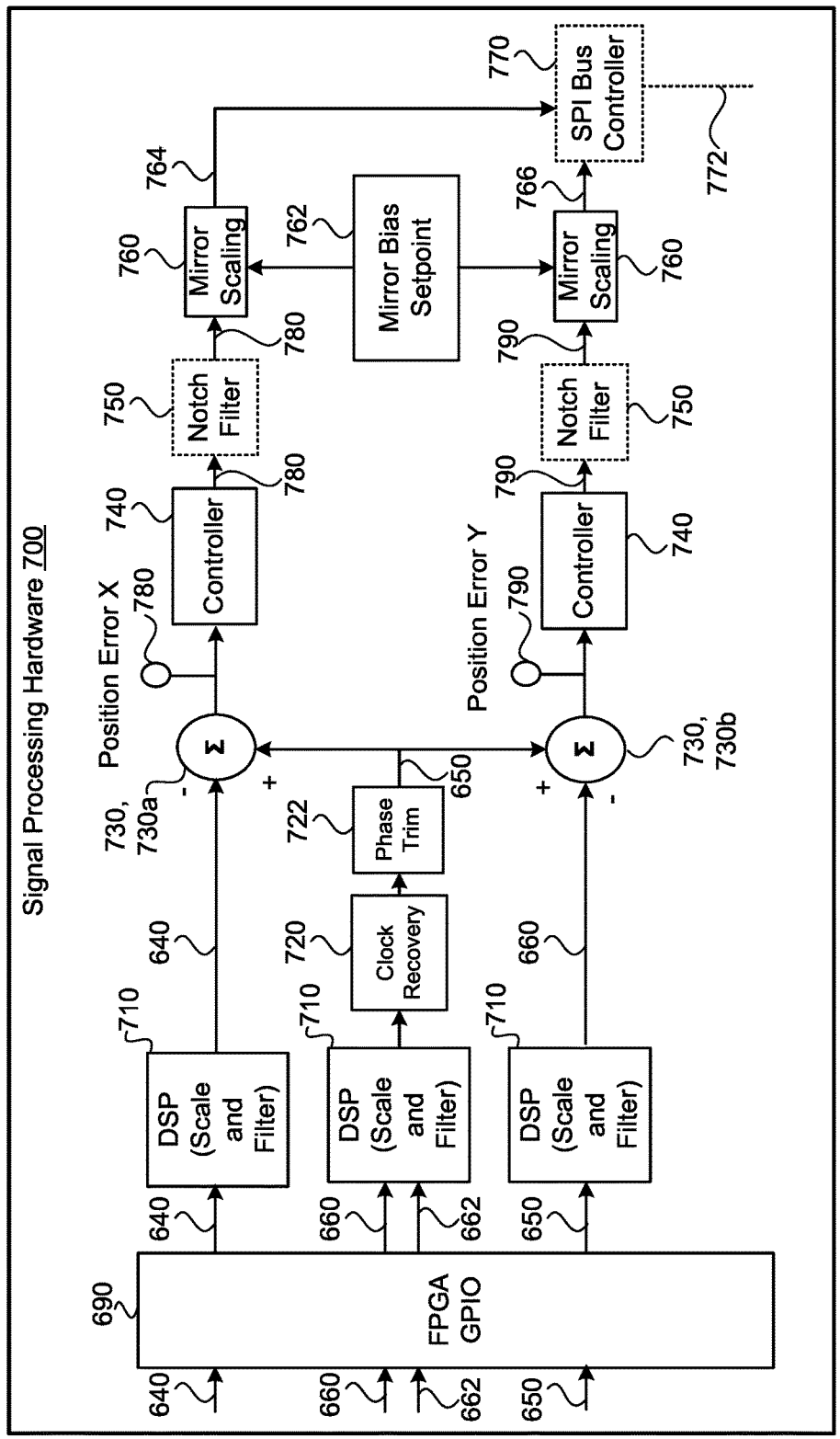
FIG. 7 is a schematic view of data processing hardware functions.

FIG. 7 is a schematic view of example signal processing hardware 700. The signal processing hardware 700 may oversample the phasor X-axis signal 640, the phasor Y-axis signal 650, and/or the reference signal 660. In some examples, the signal processing hardware 700 samples the phasor X-axis signal 640, the phasor Y-axis signal 650, and/or the reference signal 660 at a high rate (e.g., 50 MHz). A digital signal processor 710 may receive and individually scale each of the phasor X-axis signal 640, the phasor Y-axis signal 650, and/or the reference signal 660. The digital signal processor 710 may further improve the dynamic range. A clock recovery 720, which includes a phase lock loop, receives the reference signal 660 and synchronizes a local clock of the signal processing hardware 700 to an optically received clock 662. The signal processing hardware 700 (e.g., digital signal processing hardware), using general purpose I/O, may sample the reference signal 660 and optically received clock 662. A phase trimmer 722 may receive the reference signal 660 from the clock recovery 720 and trim the phase of the reference signal 660 to account for any latency and phase shift in the analog electronics, including the signal conditioning system 600. The phase trimming of the phase trimmer 722 may be accomplished by a potentiometer or an amount adjusted by a potentiometer. A first summer 730, 730*a* adds the phasor X-axis signal 640 to the reference signal 660, resulting in an X-axis signal position error 780 (or phase difference) based on a difference between the two signals. A controller 740, such as a proportional-integral-derivative (PID) controller, receives the X-axis signal position error 780. The controller 740 may alter the X-axis signal position error 780 in response to a proportional, integral and/or derivative from the reference signal 660. In some implementations, the signal processing hardware 700 includes a notch filter 750 in communication with the controller 740 may alter the X-axis signal position error 780 to limit any errors around a specific frequency. A mirror scaling 760 may convert the X-axis signal position error 780 to an X-mirror position 764. Moreover, a mirror bias setpoint 762 may shift the X-axis signal position error 780, altering the X-mirror position 764 to account for any errors in the mirror control system 800.

In a similar fashion, a second summer 730, 730b adds the phasor Y-axis signal 650 to the reference signal 660, resulting in a Y-axis signal position error 790 (or phase difference) based on the difference between the two signals. The controller 740 receives the Y-axis signal position error 790 and alters the Y-axis signal position error 790 in response to the proportional, integral and/or derivative from the reference signal 660. The notch filter 750 may alter the Y-axis signal position error 790 to limit any errors around a specific frequency. The mirror scaling 760 may convert the Y-axis signal position error 790 to a Y-mirror position 766. Moreover, the mirror bias setpoint 762 may shift the Y-axis signal position error 790, altering the Y-mirror position 766 to account for any errors in the mirror control system 800. The X-mirror position 764 and the Y-mirror position 766 may be input into a bus controller 770 combining the X-mirror position 764 and the Y-mirror position 766 in a bus signal 772. The bus controller 770 is optional. In some examples, the X-mirror position 764 and the Y-mirror position 766 feed directly into the mirror control system 800.

Figure 8:
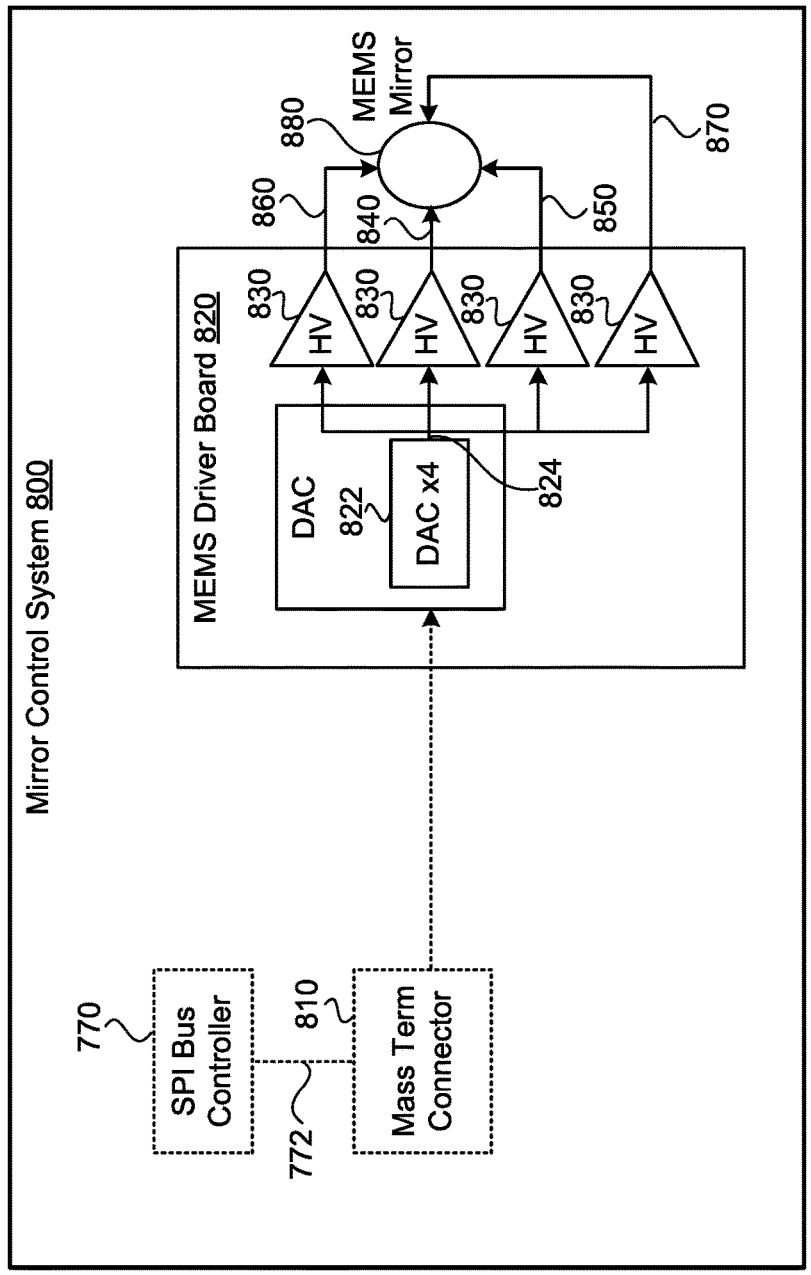
FIG. 8 is a schematic view of an example mirror control system.

FIG. 8 displays a schematic view of an example mirror control system 800. The bus signal 772 may optionally travel through a master terminal connector 810 to a mirror driver board 820. The mirror driver board 820 may include four digital-to-analog converters 822, each including an output 824. The digital-to-analog converters 822 may read the SPI signal 772 and output a representative voltage based on the digital value of the X-mirror position 764 and the Y-mirror position 766. A voltage converter 830 may scale the output 824 of the digital to analog converter 822 to an acceptable voltage for the mirror 880. In at least one example, the mirror 880 uses a driving voltage of 0-160 volts with a center set point being 80 volts. The four digital-to-analog converters 822 may each output one of the following signals: a first mirror X-signal 840; a second mirror X-signal 850; a first mirror Y-signal 860; or a second mirror Y-signal 870. The first mirror X-signal 840 and the second mirror X-signal 850 may move the mirror 880 along an axis, such as the X-axis, to align the optical communication beam 120 with the multi-axis position sensing detector 510. The first mirror Y-signal 860 and the second mirror Y-signal 870 may move the mirror 880 along another axis, such as the Y-axis, to align the optical communication beam 120 with the multi-axis position sensing detector 510, allowing the beam tracking system 400 to compensate for movement or atmospheric effect of the optical communication beam 120.

Figure 9:
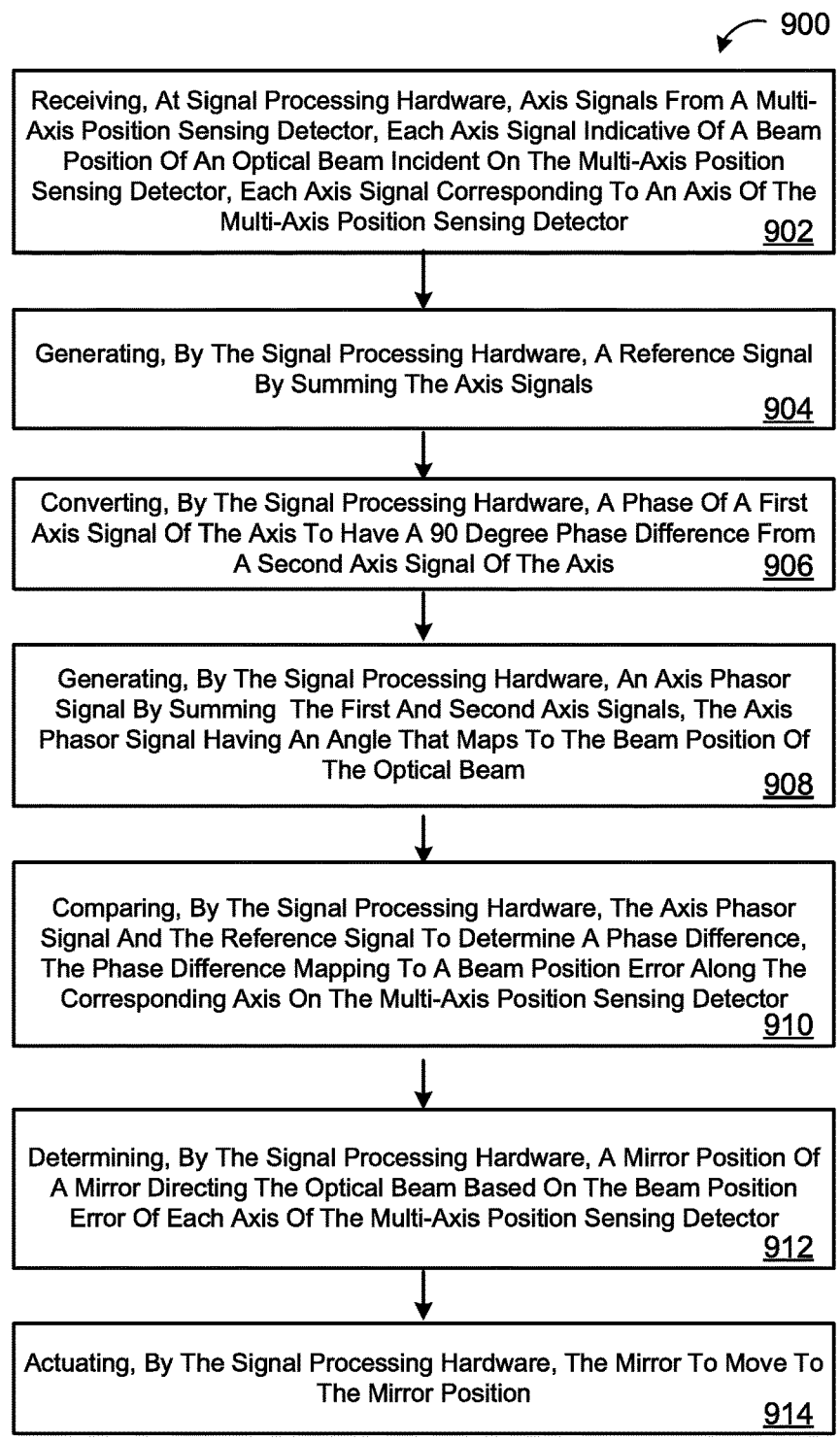
FIG. 9 is an example arrangement of operations for method of operating a beam tracking system.

FIG. 9 provides an example arrangement of operations for a method 900 for operating a beam tracking system 400. At block 902, the method 900 includes receiving, at signal processing hardware 400, axis signals 520, 530, 540, 550 from a multi-axis position sensing detector 510. Each axis signal 520, 530, 540, 550 is indicative of a beam position 122 of an optical beam incident on the multi-axis position sensing detector 510. Moreover, each axis signal 520, 530, 540, 550 corresponds to an axis 580 of the multi-axis position sensing detector 510. The axis signal 520, 530, 540, 550 may be one of the first X-axis signal 520, the second X-axis signal 530, the first Y-axis signal 540, or the second Y-axis signal 550. The first X-axis signal 520 may include a first X-axis phase 522 and a first X-axis amplitude 524 representative of the phase and amplitude of the first X-axis signal 520 respectively. The second X-axis signal 530 may include a second X-axis phase 532 and a second X-axis amplitude 534 representative of the phase and amplitude of the second X-axis signal 530 respectively. The first Y-axis signal 540 may include a first Y-axis phase 542 and a first Y-axis amplitude 544 representative of the phase and amplitude of the first Y-axis signal 540 respectively. The second Y-axis signal 550 may include a second Y-axis phase 552 and a second Y-axis amplitude 554 representative of the phase and amplitude of the second Y-axis signal 550, respectively. At block 902, the method 900 may include generating, by the signal processing hardware 400, a reference signal 660 by summing the axis signals 520, 530, 540, 550. A summing amplifier 630 may sum the first X-axis signal 520, the second X-axis signal 530, the first Y-axis signal 540, and the second Y-axis signal 550 resulting in the reference signal 660. For each axis signal 520, 530, 540, 550 of the multi-axis position sensing detector 510, the method 900 may include, at block 906, converting, by the signal processing hardware 400, a phase 522, 542 of a first axis signal 520, 540 of the axis 580 to have a 90 degree phase difference from a second axis signal 530, 550 of the axis 580. For example, the first X-axis phase 522 and/or the second X-axis phase 542 may be phase shifted 90 degrees by an all pass filter 620. At block 908, the method 900 includes generating, by the signal processing hardware 400, an axis-phasor signal 640, 650 by summing the first and second axis signals 520, 530, 540, 550. The axis-phasor signal 640, 650 has an angle that maps to the beam position 122 of the optical communication beam 120. Furthermore, the axis-phasor signal 640, 650 may be a summation of the first X-axis signal 520 and the second X-axis signal 530 and/or the first Y-axis signal 540 and the second Y-axis signal 550 by a summing amplifier 630. At block 910, the method 900 may include comparing, by the signal processing hardware 400, the axis-phasor signal 640, 650 and the reference signal 660 to determine a phase difference. The phase difference maps to a beam position error 780, 790 along the corresponding axis on the multi-axis position sensing detector 510. A summer 730 may compare the phasor X-signal 640 to the reference signal 660, resulting in the X-axis signal position error 780. Similarly, the summer 730 may compare the phasor Y-signal 650 to the reference signal 660, resulting in the Y-axis signal position error 790. At block 912, the method 900 may include determining, by the signal processing hardware 400, a mirror position 764, 766 of a mirror 880 directing the optical communication beam 120 based on the beam position error 780, 790 of each axis of the multi-axis position sensing detector 510. The mirror position 764, 766 may include the X-mirror position 764 and the Y-mirror position 766. At block 914, the method 900 may include actuating, by the signal processing hardware 400, the mirror 880 to move to the mirror position 764, 766. The mirror driver 820 may actuate the mirror 880 based on voltages from a digital to analog converter 822 including a first mirror X-signal 840, a second mirror X-signal 850, a first mirror Y-signal 860, and a second mirror Y-signal 870.

In some implementations, the method 900 includes receiving, at the signal processing hardware 400, photocurrents 520, 530, 540, 550 for each axis of the multi-axis position sensing detector 510, and converting, by at least one transimpedance amplifier 560 of the signal processing hardware 400, the photocurrents 520, 530, 540, 550 to the corresponding axis signals 520, 530, 540, 550, each axis signal 520, 530, 540, 550 being a voltage signal. Each photocurrent 520, 530, 540, 550 may have an amplitude 524, 534, 544, 554 dependent on a beam power 124 and the beam position 122 of the optical communication beam 120. The method 900 may include high pass filtering each axis signal 520, 530, 540, 550 using at least one single or multi-pole filter 610 of the signal processing hardware 400. The method 900 may also include low pass filtering each axis-phasor signal 640, 650 using at least one single or multi-pole filter 610, 620 of the signal processing hardware 400. In some examples, the method 900 includes modifying, by at least one limiting amplifier 670 of the signal processing hardware 400, each axis-phasor signal 640, 650 or axis signal 520, 530, 540, 550 and the reference signal 660 to each represent a corresponding logarithmic gain.

In some implementations, the method 900 includes filtering, by at least one comparator 680 of the signal processing hardware 400, the modified axis-phasor signals 640, 650 and the modified reference signal 660 to perform an edge detection on each of the modified axis-phasor signals 640, 650 and the modified reference signal 660. The method 900 may also include synchronizing, by the signal processing hardware 400, the reference signal 660 to a reference clock 662 of the signal processing hardware 400. The method 900 may also include trimming a frequency of the reference signal 660 using a digital potentiometer or phase trimmer 722 of the signal processing hardware 400. The method 900 may further include determining, by a proportional-integral-derivative (PID) controller 740 of the signal processing hardware 400, the mirror position 764, 766 in consideration of a rate of change of the mirror position 764, 766 based on the beam position error 780, 790 of at least one axis of the multi-axis position sensing detector 510. The method may also include filtering, by a notch filter 750 in communication with the controller 740, the mirror position 764, 766 to attenuate a target frequency.

Figure 10:
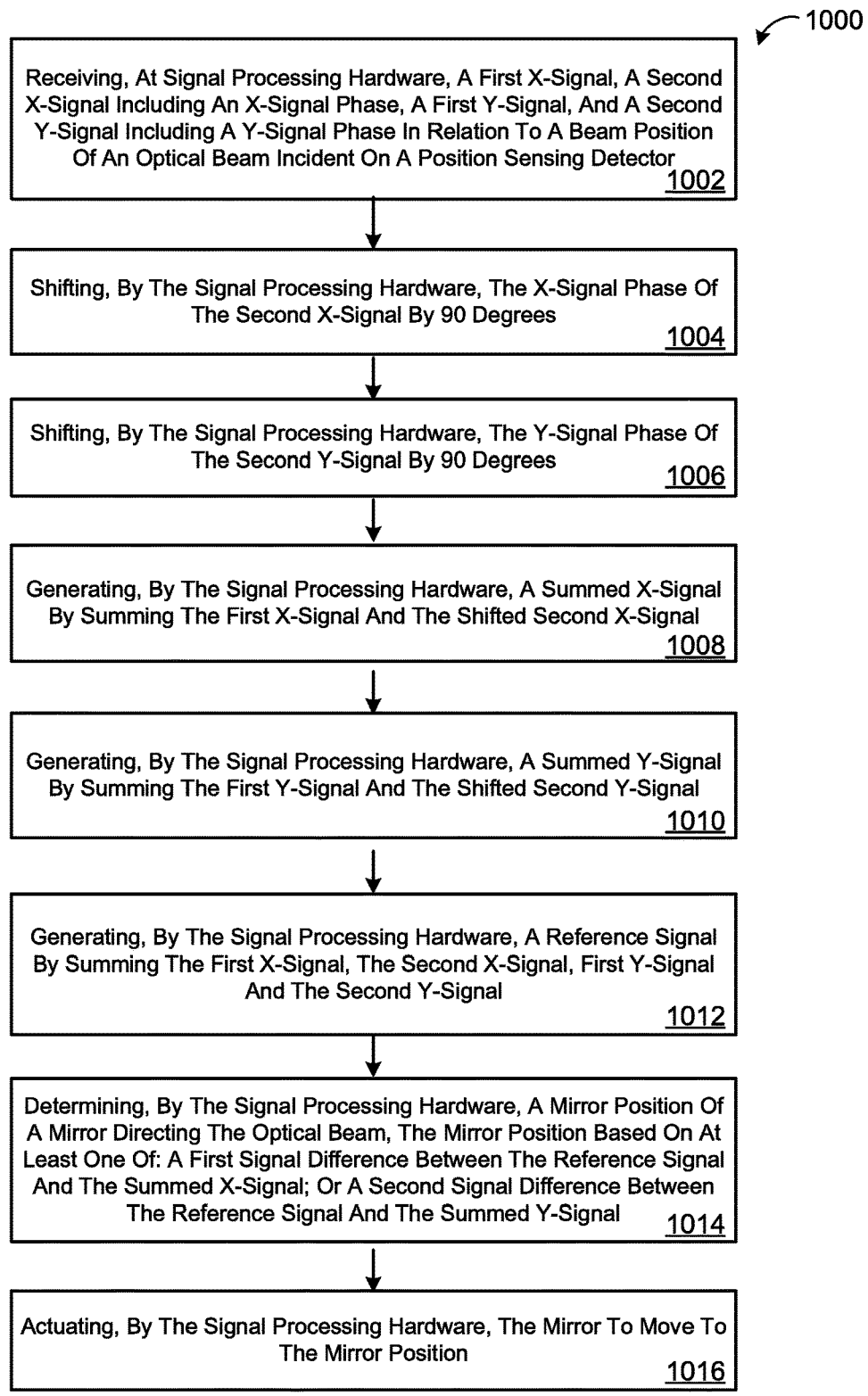
FIG. 10 is an example arrangement of operations for method of operating a beam tracking system.

FIG. 10 provides an example arrangement of operations for a method 1000 for operating a beam tracking system 400. At block 1002, the method 1000 may include receiving, at signal processing hardware 400, a first X-signal 520, a second X-signal 530 including an X-signal phase 532, a first Y-signal 540, and a second Y-signal 550 including a Y-signal phase 552 in relation to a beam position 122 of an optical communication beam 120 incident on a position sensing detector 510. At block 1004, the method 1000 may include shifting, by the signal processing hardware 400, the X-signal phase 532 of the second X-signal 530 by 90 degrees. The X-signal phase 532 of the second X-signal 530 may be shifted by an all pass filter 620. At block 1006, the method 1000 may include shifting, by the signal processing hardware 400, the Y-signal phase 552 of the second Y-signal 550 by 90 degrees. The Y-signal phase 552 of the second Y-signal 550 may be shifted by an all pass filter 620. At block 1008, the method 1000 may include generating, by the signal processing hardware 400, a summed X-signal, or phasor X-signal 640, by summing the first X-signal 520 and the shifted second X-signal 530. The first X-signal 520 and the shifted second X-signal 530 may be summed by a summing amplifier 630 to create the summed X-signal, or phasor X-signal 640. At block 1010, the method 1000 may include generating, by the signal processing hardware 400, a summed Y-signal, or phasor Y-signal 650, by summing the first Y-signal 540 and the shifted second Y-signal 550. The first Y-signal 540 and the shifted second Y-signal 550 may be summed by a summing amplifier 630 to create the summed Y-signal, or phasor Y-signal 650. At block 1012, the method 1000 may include generating, by the signal processing hardware 400, a reference signal 660 by summing the first X-signal 520, the second X-signal 530, first Y-signal 540 and the second Y-signal 550. The first X-signal 520, the second X-signal 530, first Y-signal 540 and the second Y-signal 550 may be summed by a summing amplifier 630 to generate a reference signal 660. At block 1014, the method 1000 may further include determining, by the signal processing hardware 400, a mirror position 764, 766 of a mirror 880 directing the optical communication beam 120, the mirror position 764, 766 based on at least one of: a first signal difference between the reference signal 660 and the summed X-signal 640; or a second signal difference between the reference signal 660 and the summed Y-signal 650. A summer 730 may sum the difference the reference signal 660 and the summed X-signal 640 and/or a second signal difference between the reference signal 660 and the summed Y-signal 650 to create a signal difference. At block 1016, the method 1000 may include actuating, by the signal processing hardware 400, the mirror 880 to move to the mirror position 764, 766.

The method 1000 includes receiving, at the signal processing hardware 400, a first X-photocurrent 520, a second X-photocurrent 530, a first Y-photocurrent 540, and a second Y-photocurrent 550, each photocurrent 520, 530, 540, 550 having an amplitude 524, 534, 544, 554 dependent on a beam power 124 and the beam position 122 of the optical communication beam 120. The method 1000 may also include converting, by at least one transimpedance amplifier 560 of the signal processing hardware 400, the first X-photocurrent 520, the second X-photocurrent 530, the first Y-photocurrent 540, and the second Y-photocurrent 550 to the corresponding first X-signal 520, the second X-signal 530, the first Y-signal 540, and the second Y-signal 550, each signal 520, 530, 540, 550 being a voltage signal. The method 1000 may also include high pass filtering, by at least one single or multi-pole filter 610 of the signal processing hardware 400, the first X-signal 520, the second X-signal 530, the first Y-signal 540, and the second Y-signal 550. In some examples, the method 1000 includes modifying, by at least one limiting amplifier 670 of the signal processing hardware 400, the summed X-signal 640, the summed Y-signal 650, and the reference signal 660 to each represent a corresponding logarithmic gain. The modified summed X-signal 640, the modified summed Y-signal 650, and the modified reference signal 660 may each be proportional to a logarithm of the corresponding summed X-signal 640, the corresponding summed Y-signal 650, and the corresponding reference signal 660.

In some implementations, the method 1000 includes amplifying, by the signal processing hardware 400, the modified summed X-signal 640, the modified summed Y-signal 650, and the modified reference signal 660 to each represent the corresponding logarithmic gain. The method 1000 may also include filtering, by at least one comparator 680 of the signal processing hardware 400, the modified summed X-signal 640, the modified summed Y-signal 650, and the modified reference signal 660 to perform an edge detection on each of the modified summed X-signal 640, the modified summed Y-signal 650, and the modified reference signal 660. In some examples, the method 1000 includes trimming a frequency of the reference signal 660 using a digital potentiometer or phase trimmer 722 of the signal processing hardware 400. In some examples, the method 1000 includes determining, by a proportional-integral-derivative (PID) controller 740 of the signal processing hardware 400, the mirror position 764, 766 in consideration of a rate of change of the mirror position 764, 766 based on at least one of the first signal difference 780 or the second signal difference 790. The method may also include filtering, by a notch filter 750 in communication with the controller 740, the mirror position 764, 766 to attenuate a target frequency.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at signal processing hardware, axis signals from a position sensing detector, each axis signal indicative of a beam position of an optical beam incident on the position sensing detector;
   for an axis of the position sensing detector:
      converting, by the signal processing hardware, a phase of a first axis signal of the axis to have a 90 degree phase difference from a second axis signal of the axis, resulting in a phase converted first axis signal;
      generating, by the signal processing hardware, an axis-phasor signal by summing the phase converted first axis signal and the second axis signal, the axis-phasor signal indicative of the beam position of the optical beam; and
      comparing, by the signal processing hardware, the axis-phasor signal and a reference signal to determine a phase difference, the reference signal based on the axis signals, and the phase difference mapping to a beam position error along the corresponding axis on the multi-axis position sensing detector; and
   determining, by the signal processing hardware, a mirror position of a mirror directing the optical beam based on the beam position error of the axis of the position sensing detector.

2. The method of claim 1, further comprising:
   receiving, at the signal processing hardware, photocurrents for the axis of the position sensing detector, each photocurrent having an amplitude dependent on a beam power and the beam position of the optical beam; and
   converting, by at least one transimpedance amplifier of the signal processing hardware, the photocurrents to the corresponding axis signals, each axis signal being a voltage signal.

3. The method of claim 1, further comprising high pass filtering each axis signal using at least one single or multi-pole filter of the signal processing hardware.

4. The method of claim 1, further comprising low pass filtering the axis-phasor signal using at least one single or multi-pole filter of the signal processing hardware.

5. The method of claim 1, further comprising modifying, by at least one limiting amplifier of the signal processing hardware, the axis-phasor signal and the reference signal to each represent a corresponding logarithmic gain.

6. The method of claim 5, further comprising filtering, by at least one comparator of the signal processing hardware, the modified axis-phasor signal and the modified reference signal to perform an edge detection on the modified axis-phasor signal and the modified reference signal.

7. The method of claim 6, further comprising synchronizing, by the signal processing hardware, the reference signal to a reference clock of the signal processing hardware.

8. The method of claim 7, further comprising trimming a frequency of the reference signal using a digital potentiometer of the signal processing hardware.

9. The method of claim 1, further comprising determining, by a controller of the signal processing hardware, the mirror position in consideration of a rate of change of the mirror position based on the beam position error of the axis of the position sensing detector.

10. The method of claim 1, further comprising filtering, by a notch filter in communication with the controller, the mirror position to attenuate a target frequency.

11. An optical beam tracking system comprising:
    a position sensitive detector configured to output a first axis signal and a second axis signal in relation to a beam position of an optical beam incident on the position sensitive detector, the second axis signal including an axis signal phase;
    at least one phase shifter in communication with the position sensitive detector and configured to shift the axis signal phase of the second axis signal by 90 degrees;
    at least one summing amplifier in communication with the position sensitive detector and the at least one phase shifter, the at least one summing amplifier configured to output a summed axis signal comprising a summation of the first axis signal and the shifted second axis signal; and
    signal processing hardware in communication with the at least one summing amplifier and configured to determine a mirror position of a mirror directing the optical beam, the mirror position based on a signal difference between a reference signal and the summed axis signal.

12. The optical beam tracking system of claim 11, wherein the first axis signal and the second axis signal are associated with a common axis of the position sensitive detector.

13. The optical beam tracking system of claim 11, wherein the signal processing hardware is configured to actuate the mirror to move to the mirror position.

14. The optical beam tracking system of claim 11, further comprising at least one single or multi-pole filter in communication with the position sensitive detector and configured to high-pass filter the first axis signal and the second axis signal.

15. The optical beam tracking system of claim 11, further comprising at least one limiting amplifier in communication with the at least one summing amplifier, the at least one limiting amplifier configured to:
    receive the summed axis signal and the reference signal;
    modify the summed axis signal and the reference signal to each represent a logarithmic gain; and
    output the modified summed axis signal and the modified reference signal, each modified signal proportional to a logarithm of the corresponding received signal.

16. The optical beam tracking system of claim 15, further comprising at least one comparator in communication with the at least one limiting amplifier, the at least one comparator configured to perform an edge detection on each of the modified summed axis signal and the modified reference signal.

17. The optical beam tracking system of claim 16, further comprising a digital potentiometer in communication with the at least one comparator, the digital potentiometer configured to trim a frequency of the reference signal.

18. The optical beam tracking system of claim 11, wherein the signal processing hardware comprises a controller configured to determine the mirror position in consideration of a rate of change of the mirror position based on the signal difference between the reference signal and the summed axis signal.

19. The optical beam tracking system of claim 18, further comprising a notch filter in communication with the controller, the notch filter configured to filter the mirror position to attenuate a target frequency.

20. The optical beam tracking system of claim 18, further comprising a mirror scaling calculator in communication with the controller, the mirror scaling calculator configured to generate complimentary first and second mirror signals that rotate away from a mirror bias set point.

* * * * *

UNITED STATES PATENT AND TRADEMARK OFFICE
CERTIFICATE OF CORRECTION

PATENT NO. : 10,277,319 B2
APPLICATION NO. : 15/889193
DATED : April 30, 2019
INVENTOR(S) : Robert Steinkraus and Klaus Ulander It is certified that error appears in the above-identified patent and that said Letters Patent is hereby corrected as shown below:

In the Claims

Claim 1:
Column 19, Line 18:
Now reads "position sensing detector,"; should read --multi-axis position sensing detector,--

Column 19, Line 20:
Now reads "position sensing detector;"; should read --multi-axis position sensing detector;--

Column 19, Line 21:
Now reads "position sensing detector;"; should read --multi-axis position sensing detector;--

Claim 2:
Column 19, Line 43:
Now reads "position sensing detector,"; should read --multi-axis position sensing detector,--

Signed and Sealed this
Nineteenth Day of November, 2019

Andrei Iancu
*Director of the United States Patent and Trademark Office*